Feb. 13, 1934.   O. J. SUNDSTRAND   1,946,505
PLURAL-COUNTER COMPUTING MACHINE
Original Filed Nov. 29, 1927   14 Sheets-Sheet 1
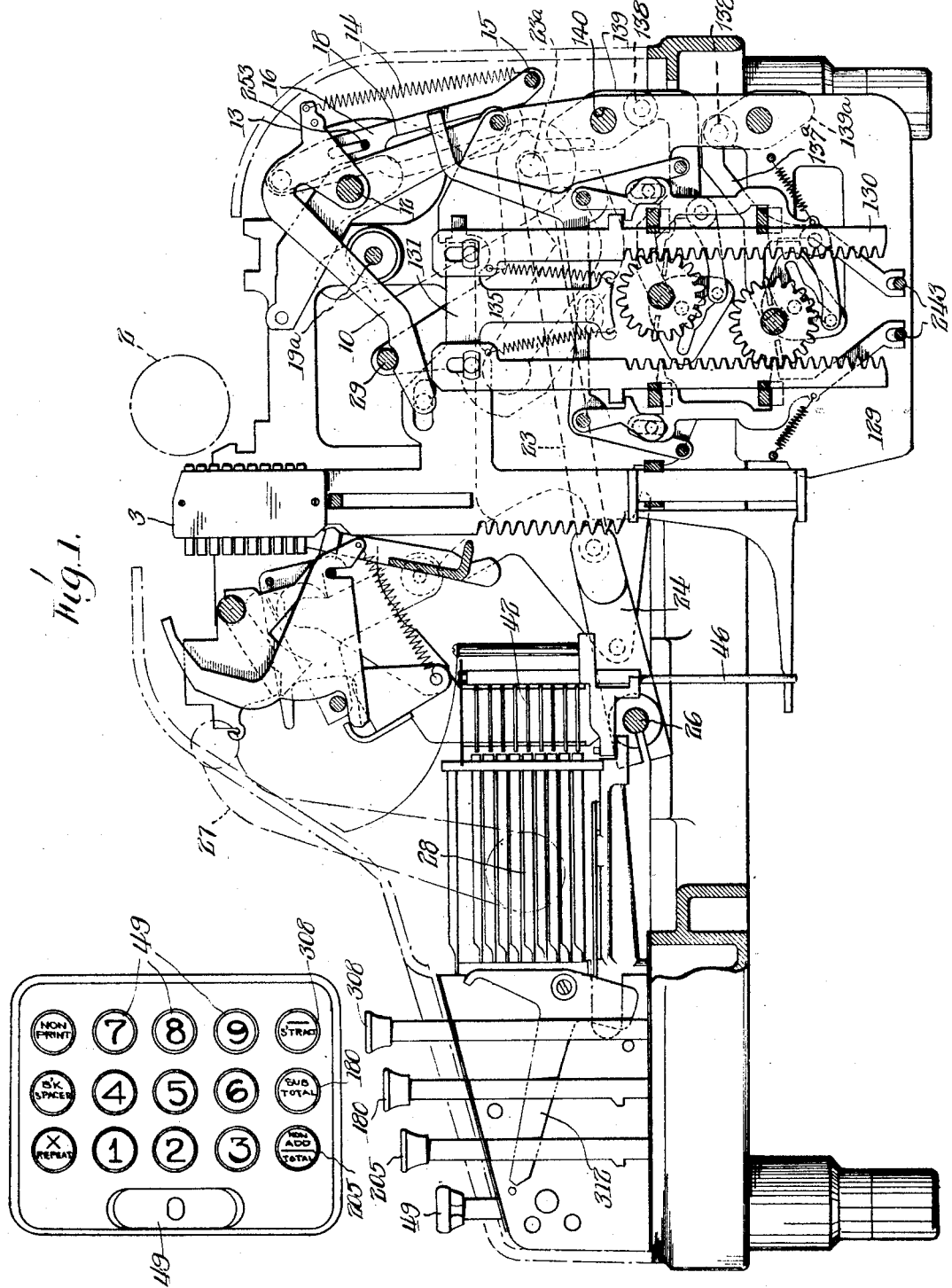
Inventor:—
Oscar J. Sundstrand,
By Churdahl Parker & Carlson
attys.

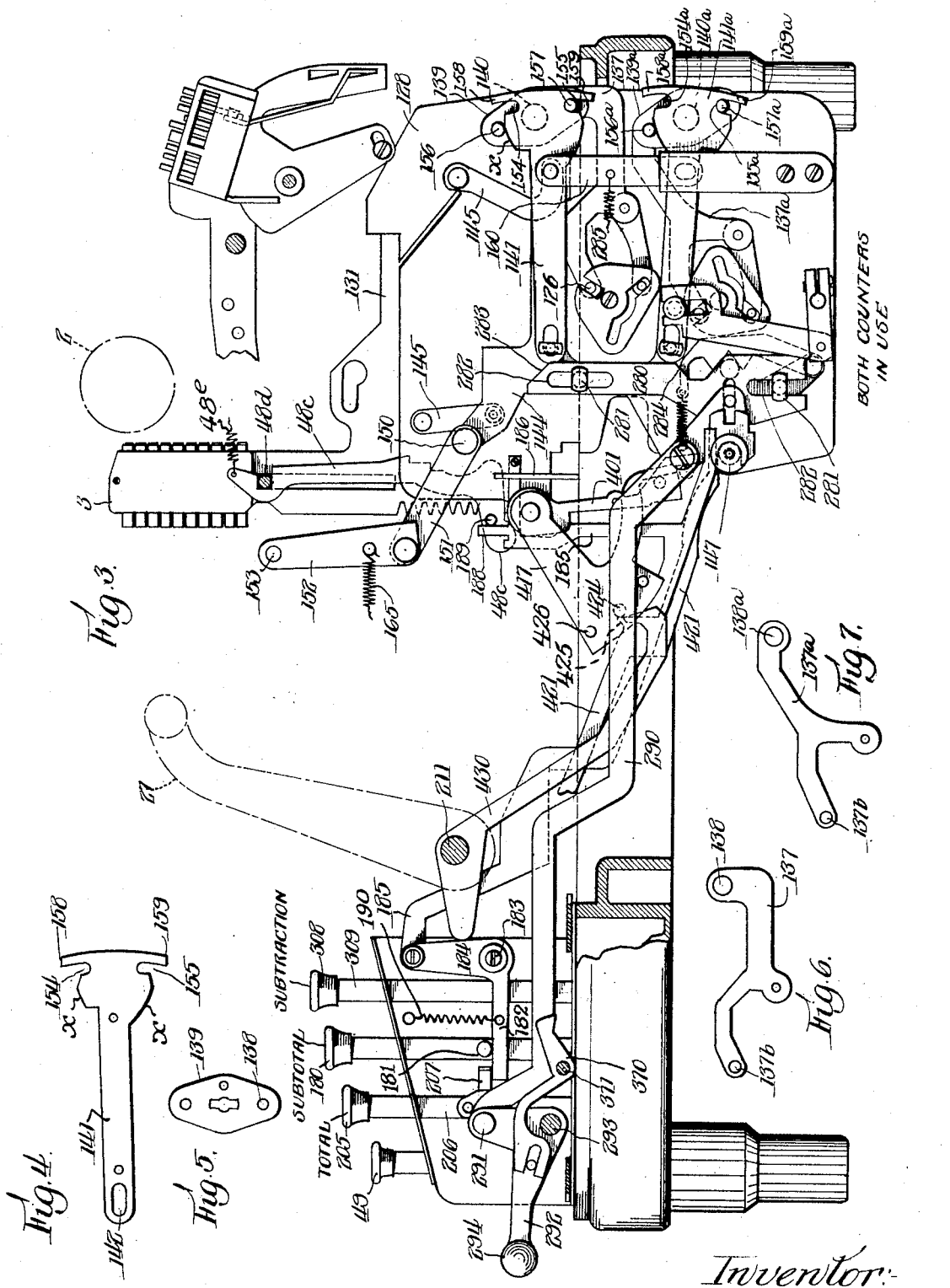

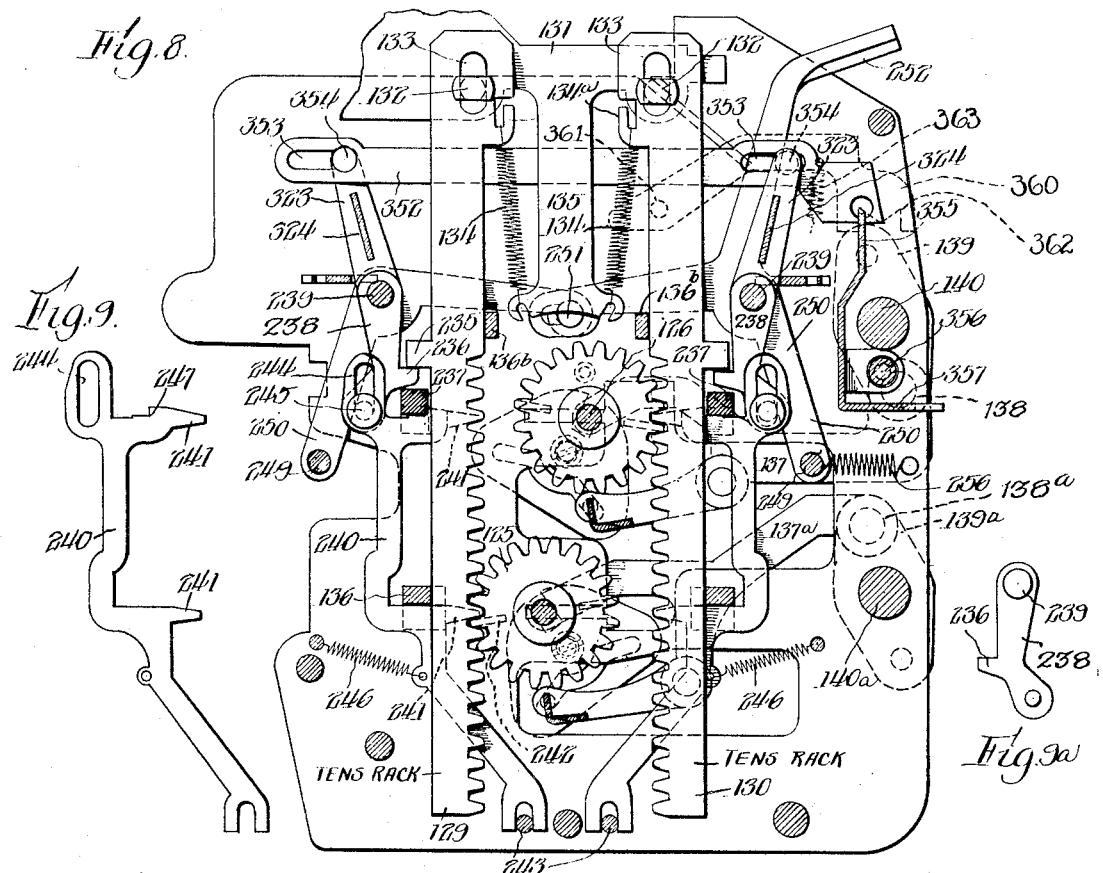
Fig. 8.
Fig. 9.
Fig. 9a.
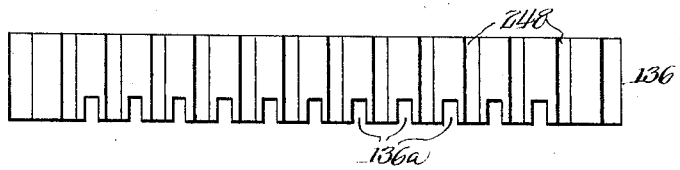
Fig. 10.
UNDERSIDE VIEW
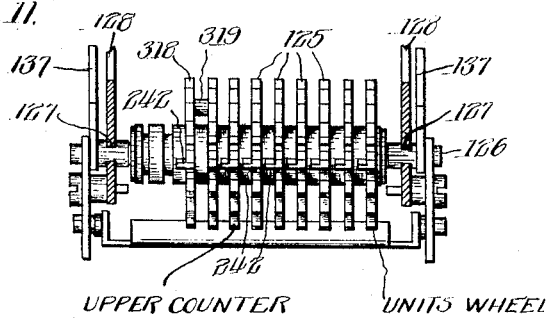
Fig. 11.
UPPER COUNTER UNITS WHEEL Feb. 13, 1934.   O. J. SUNDSTRAND   1,946,505
PLURAL-COUNTER COMPUTING MACHINE
Original Filed Nov. 29, 1927   14 Sheets-Sheet 4
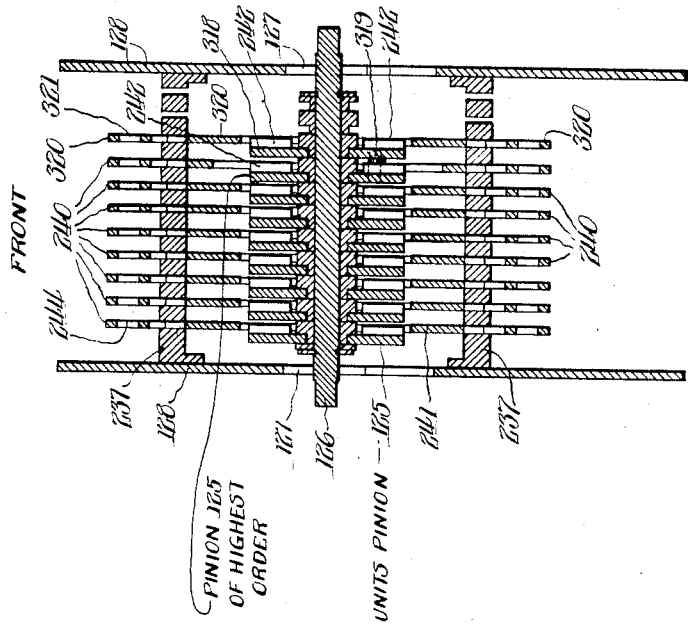
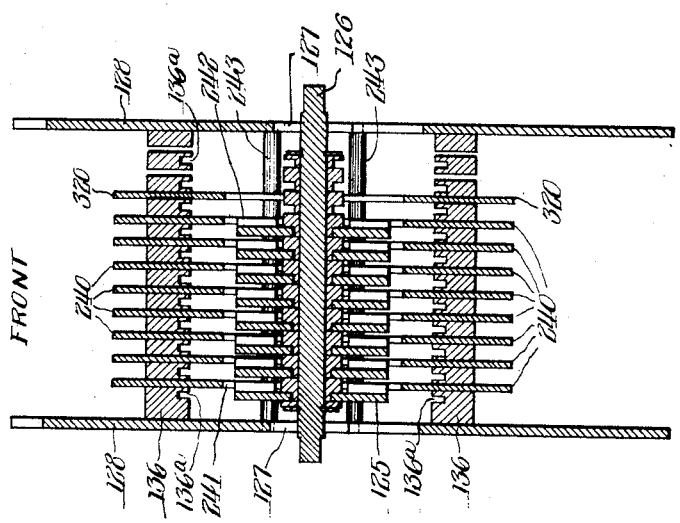
Inventor
Oscar J. Sundstrand,
By Chindahl Parker Carlson
Attys.

Feb. 13, 1934. O. J. SUNDSTRAND 1,946,505
PLURAL-COUNTER COMPUTING MACHINE
Original Filed Nov. 29, 1927  14 Sheets-Sheet 5
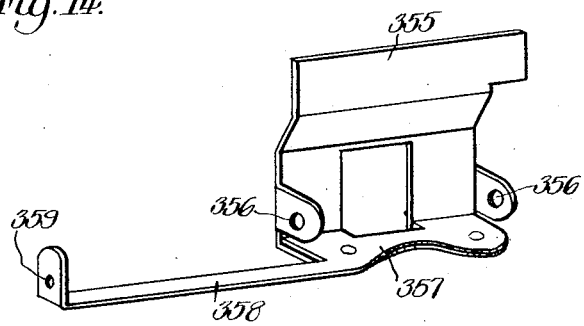
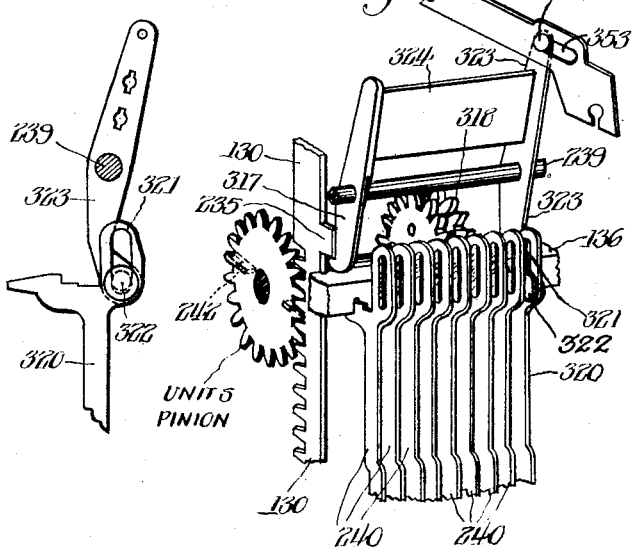
Inventor-
Oscar J. Sundstrand,
By Chindahl Parker & Carlson
Attys.

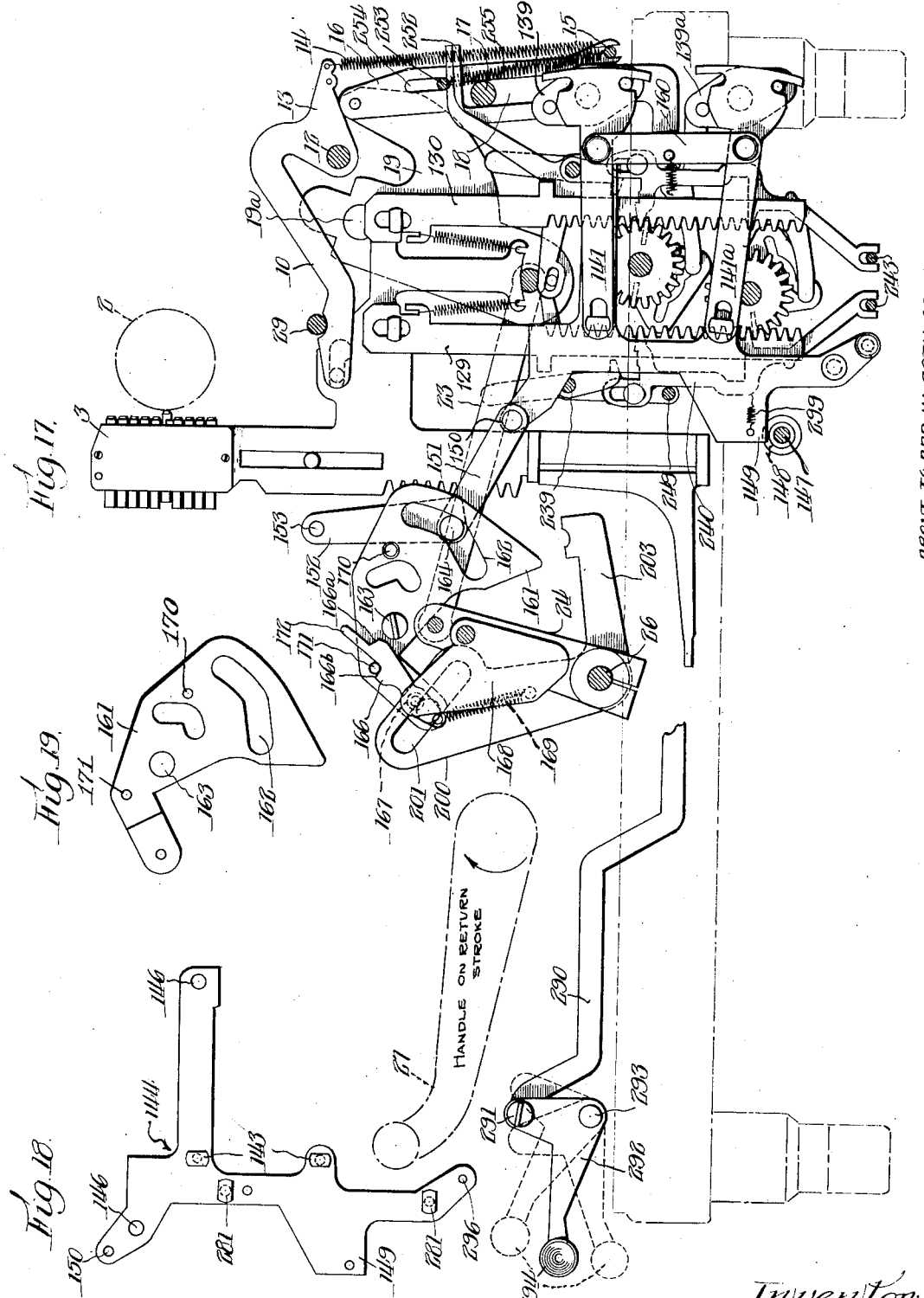

Feb. 13, 1934.  O. J. SUNDSTRAND  1,946,505
PLURAL-COUNTER COMPUTING MACHINE
Original Filed Nov. 29, 1927  14 Sheets-Sheet 7
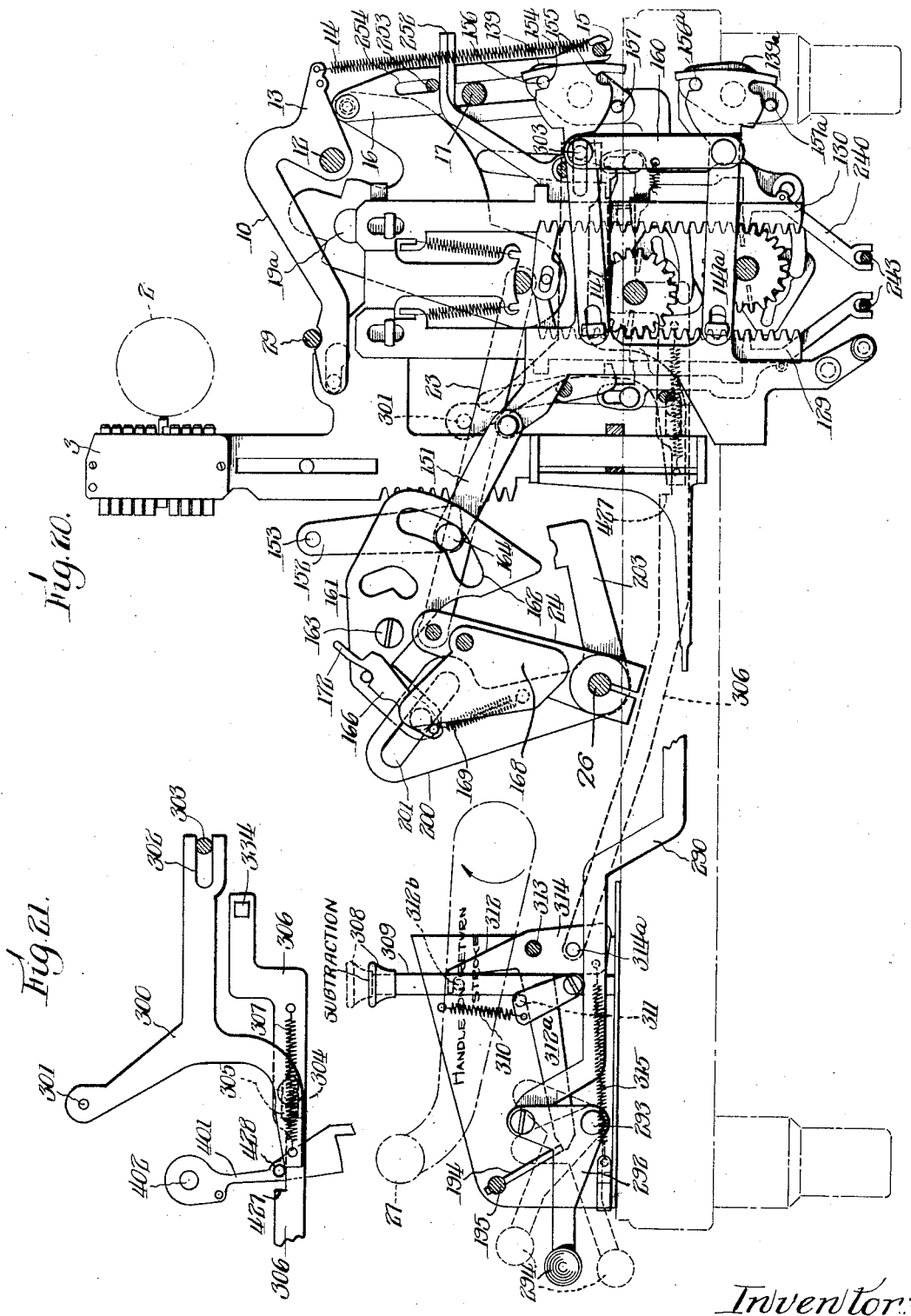
Inventor:-
Oscar J. Sundstrand,
By Lindahl Parker Carlson
Attys.

Feb. 13, 1934.     O. J. SUNDSTRAND     1,946,505
PLURAL-COUNTER COMPUTING MACHINE
Original Filed Nov. 29, 1927     14 Sheets-Sheet 8
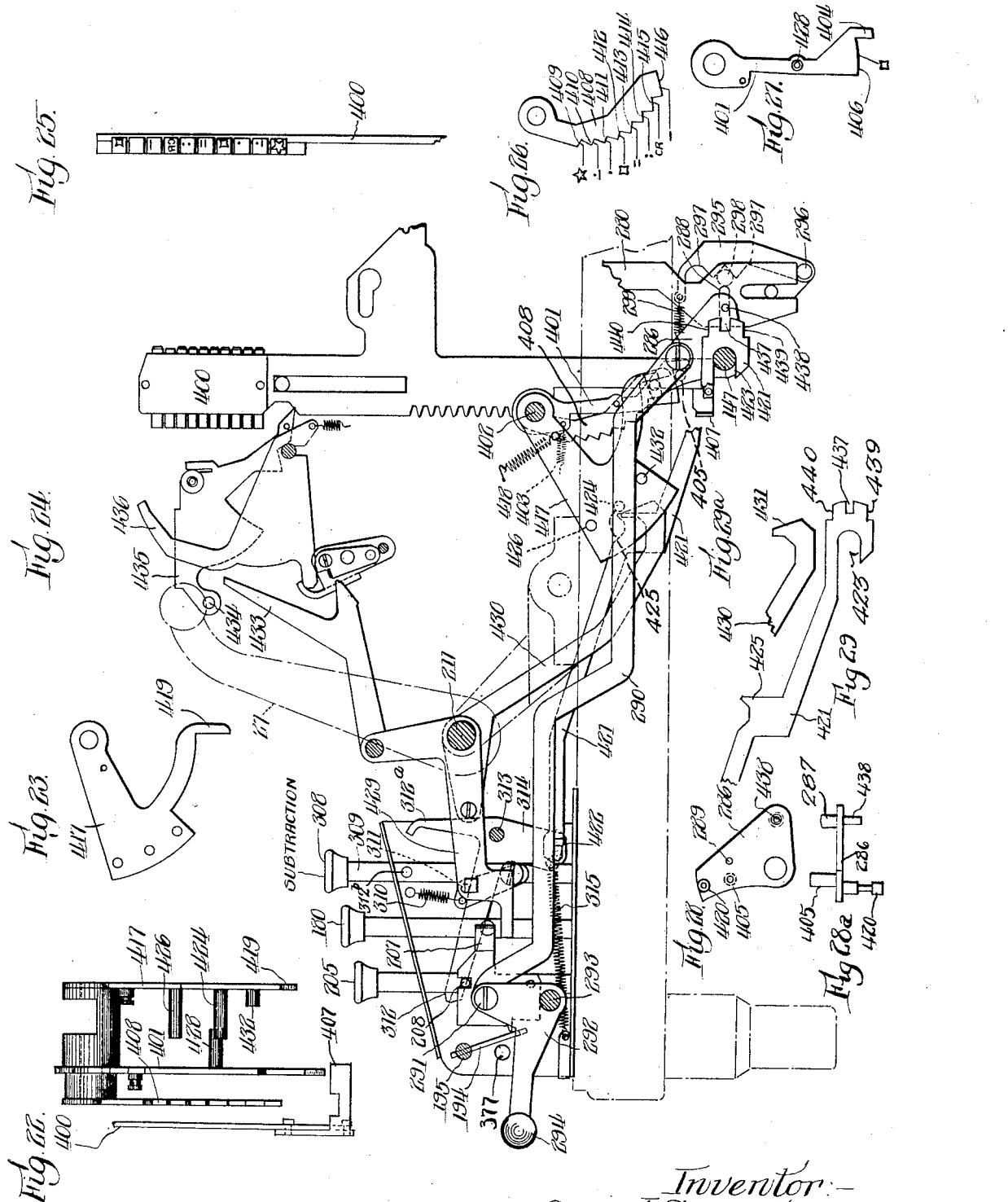
Inventor:—
Oscar J. Sundstrand,
By Chindahl, Parker Carlson
attys.

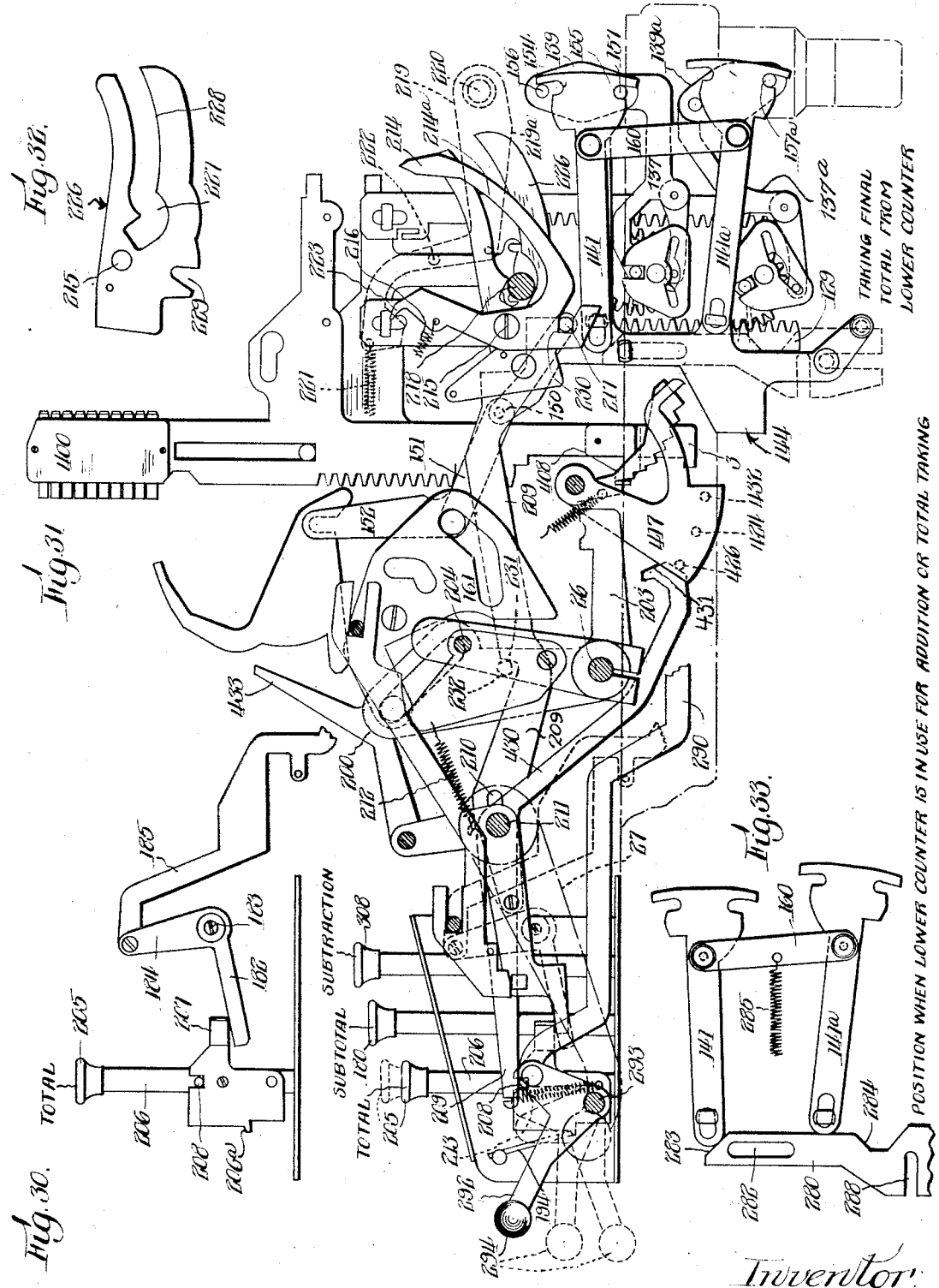

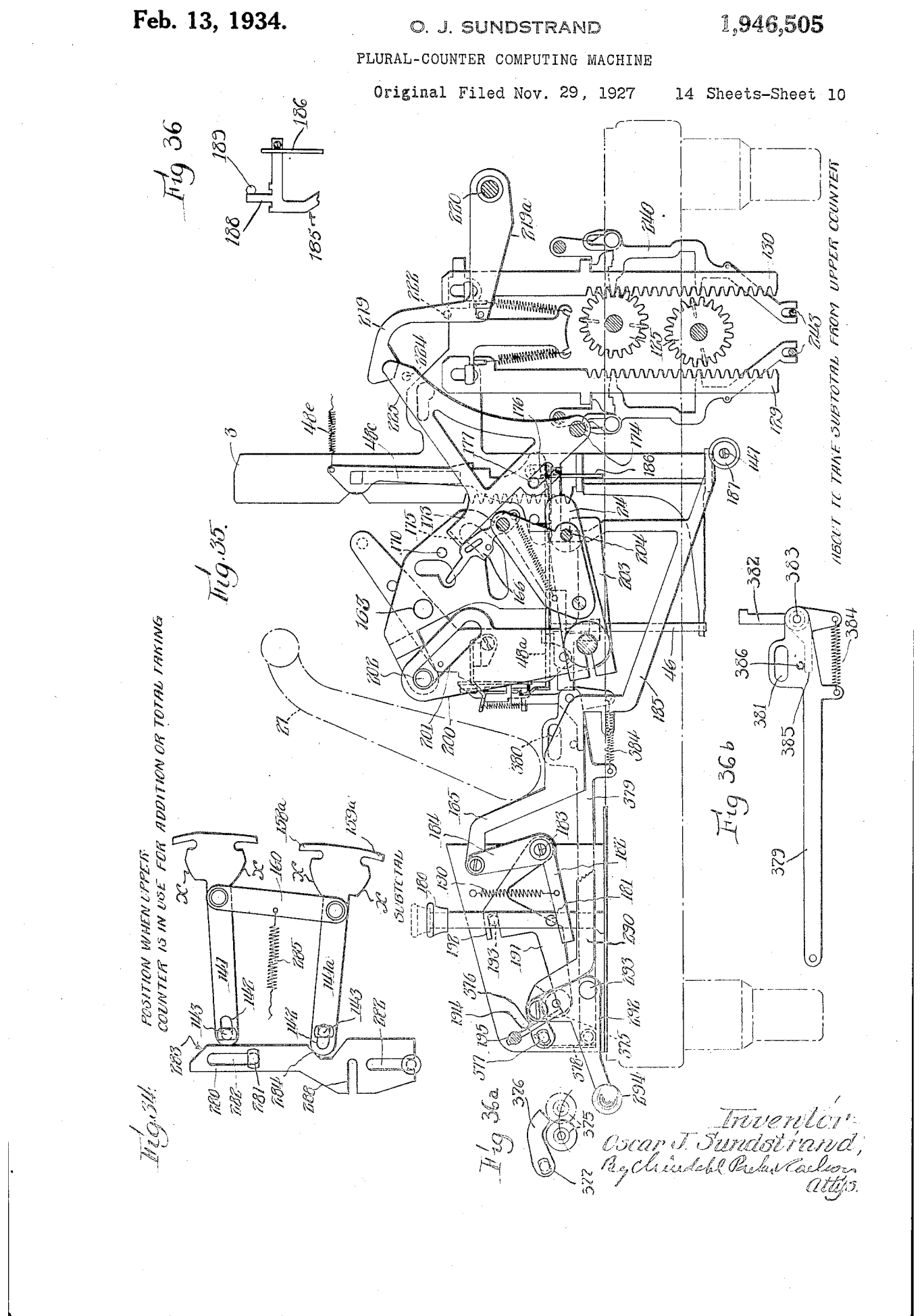

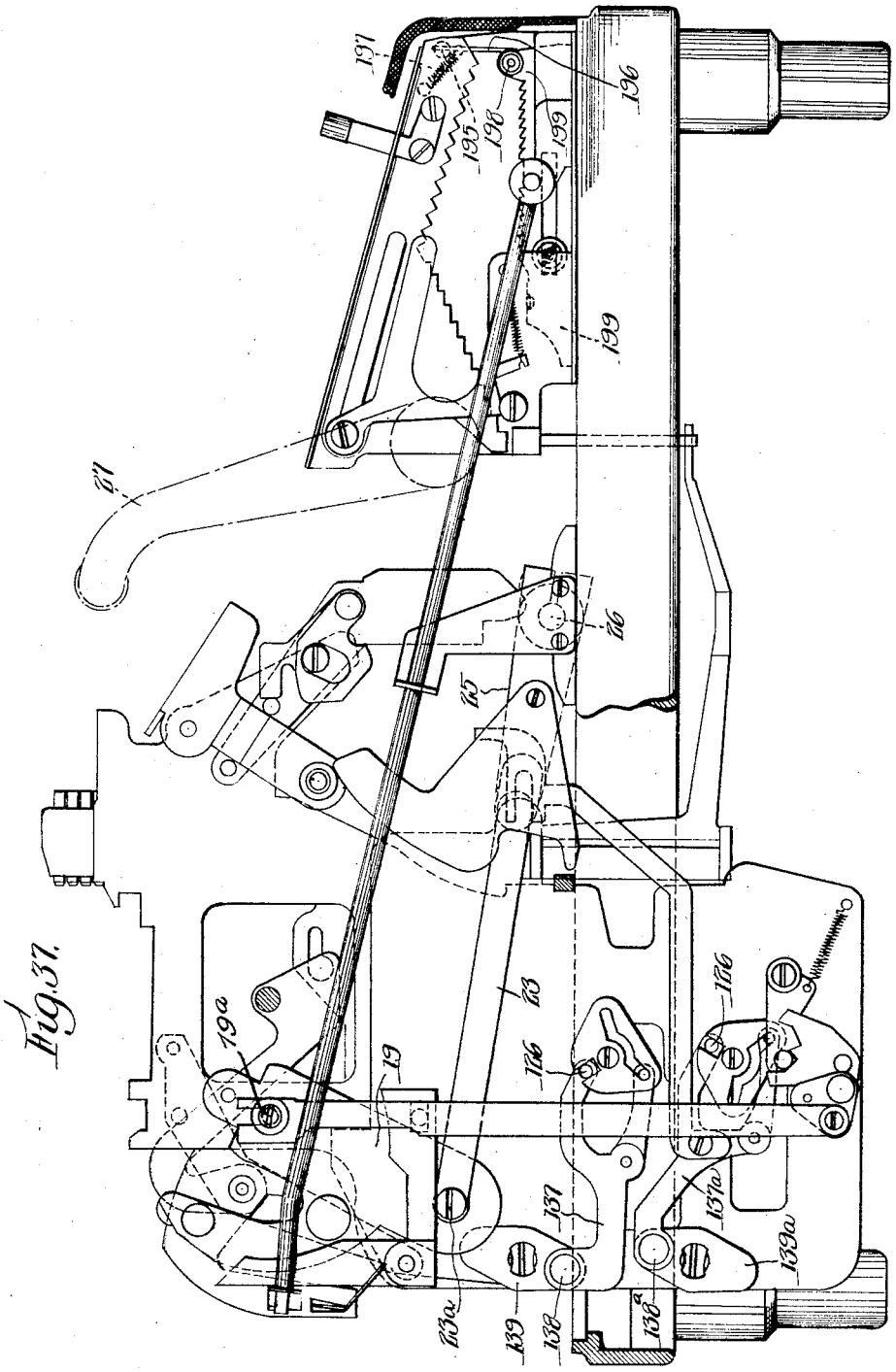

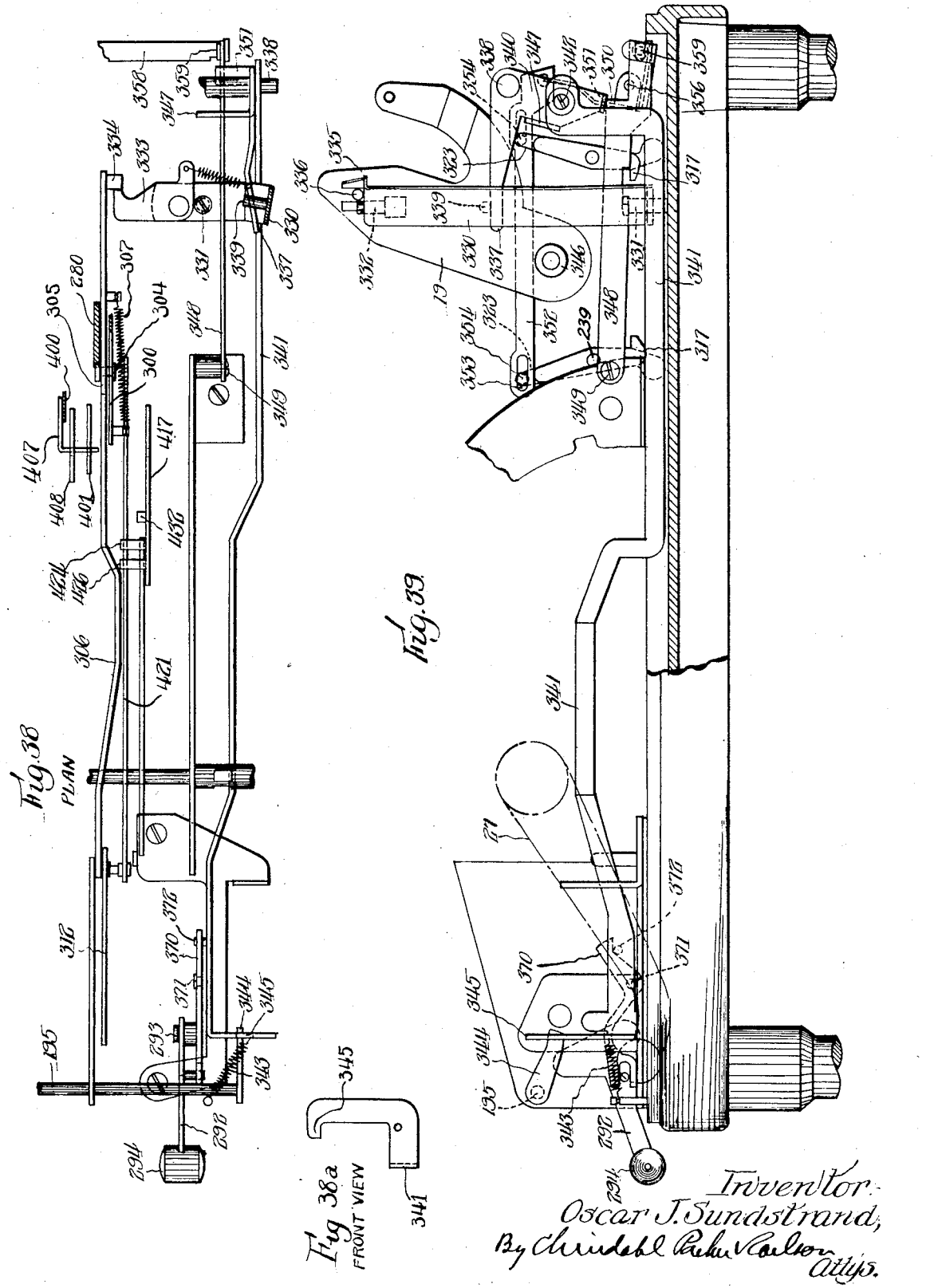

Feb. 13, 1934.    O. J. SUNDSTRAND    1,946,505
PLURAL-COUNTER COMPUTING MACHINE
Original Filed Nov. 29, 1927    14 Sheets-Sheet 13
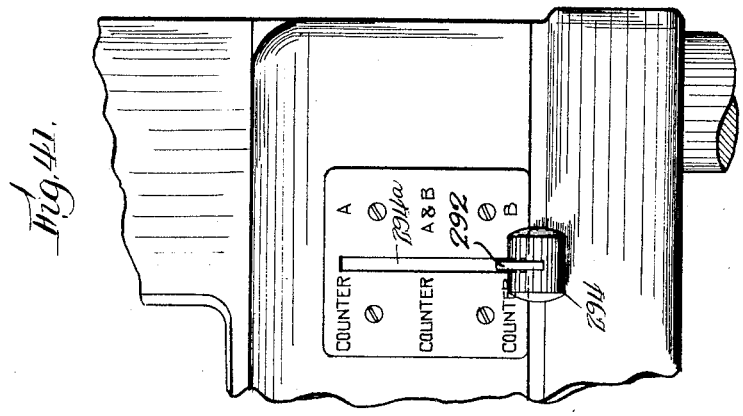
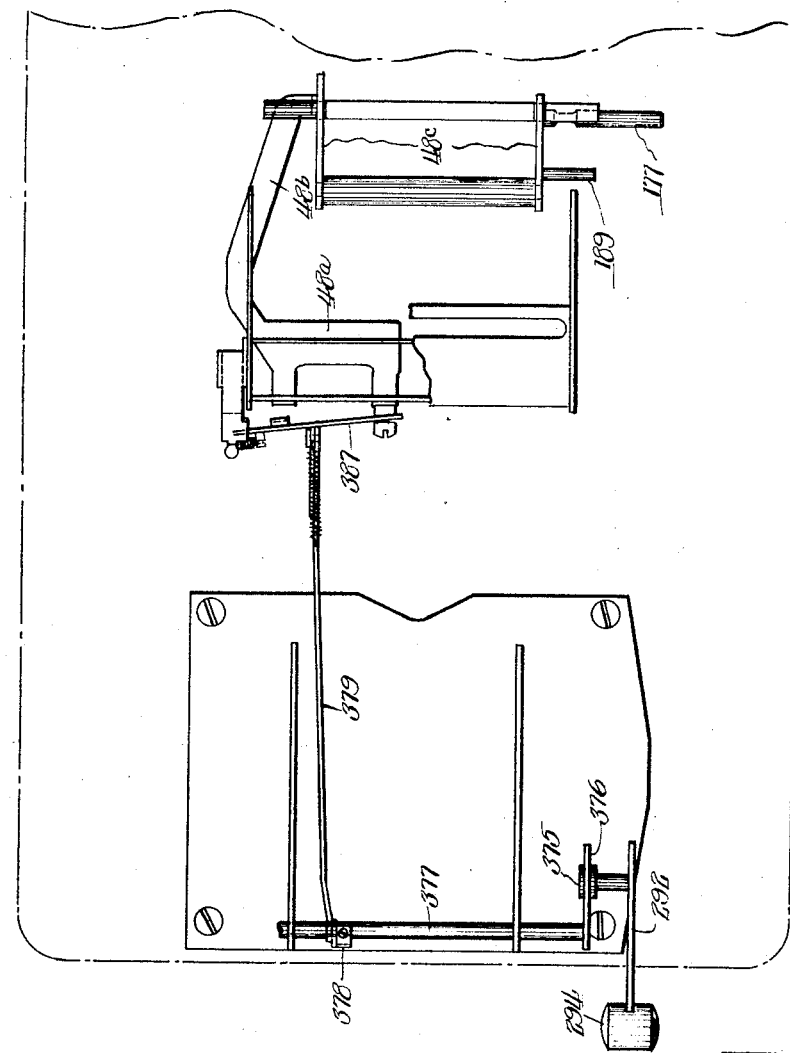
Inventor
Oscar J. Sundstrand,
By Chindahl Parker & Carlson
Attys.

Fig. 46.

| Color | Amount | Operation | Counter |
|---|---|---|---|
| RED | ¤ | CLEAR SIGNAL | COUNTER "B" |
| BLACK | 12.54 | ADDED AMOUNT | |
| BLACK | 12.35– | SUBTRACT | |
| BLACK | 26.35 ¤ | NON ADD | |
| | | | |
| RED | .19 | SUB-TOTAL | |
| RED | .19 ¤ | GRAND TOTAL | |
| | | | |
| RED | ¤ | CLEAR SIGNAL | |
| BLACK | 15.24 | ADDED AMOUNT | |
| BLACK | 15.29– | SUBTRACT | |
| BLACK | – | SPACING STROKE | |
| RED | 5– | SUB-TOTAL (CREDIT BALANCE) | |
| RED | 5 CR | GRAND TOTAL (CREDIT BALANCE) | |
| | | | |
| RED | CR | CLEAR SIGNAL | COUNTER "B" |
| BLACK | 12.54 · | ADDED AMOUNT | COUNTER "A" |
| BLACK | 12.50 ÷ | SUBTRACT | |
| BLACK | · | SPACING STROKE | |
| BLACK | 26.35 ☆ | NON ADD ITEM | |
| BLACK | · | SPACING STROKE | |
| RED | 4 · | SUB-TOTAL | |
| RED | 4 ☆ | GRAND TOTAL | |
| | | | |
| RED | ☆ | CLEAR SIGNAL | COUNTER "A" |
| BLACK | 12.54 : | ADDED AMOUNT | COUNTER "A & B" |
| BLACK | 12.50 = | SUBTRACT | |
| BLACK | 3.65 ¤ | NON ADD | |
| | | | |
| RED | 4 | SUB-TOTAL | COUNTER "B" |
| RED | 4 ¤ | GRAND TOTAL | |
| BLACK | · | SPACING STROKE | COUNTER "A" |
| RED | 4 · | SUB-TOTAL | |
| RED | 4 ☆ | GRAND TOTAL | |
| | | | |
| RED | ☆ | CLEAR SIGNAL | COUNTER "A" |
| RED | ¤ | CLEAR SIGNAL | COUNTER "B" |
| BLACK | 1.25 : | ADDED AMOUNT | COUNTER "A & B" |
| BLACK | 1.25 : | ADDED AMOUNT | |
| | | | |
| RED | 2.50 ¤ | GRAND TOTAL | COUNTER "B" |
| BLACK | 1.25 : | ADDED AMOUNT | COUNTER "A & B" |
| BLACK | 1.25 : | ADDED AMOUNT | |
| | | | |
| RED | 2.50 ¤ | GRAND TOTAL | COUNTER "B" |
| BLACK | · | SPACING STROKE | COUNTER "A" |
| RED | 5.00 ☆ | GRAND TOTAL | |
| | | | |
| RED | ☆ | CLEAR SIGNAL | COUNTER "A" |
| BLACK | 125.36 · | ADDED AMOUNT | COUNTER "A" |
| BLACK | 26.35 = | SUBTRACT | COUNTER "A & B" |
| | 2.63 = | | |
| | 2.63 = | | |
| | 2.96 = | | |
| | 15.00 = | | |
| BLACK | · | SPACING STROKE | COUNTER "A" |
| RED | 75.79 ☆ | GRAND TOTAL | |
| BLACK | – | SPACING STROKE | COUNTER "B" |
| RED | 49.57 CR | GRAND TOTAL (CREDIT BALANCE) | |

Inventor
Oscar J. Sundstrand,
By Churdahl Parker Carlson
attys.

Patented Feb. 13, 1934

1,946,505

UNITED STATES PATENT OFFICE 1,946,505

PLURAL-COUNTER COMPUTING MACHINE

Oscar J. Sundstrand, Rockford, Ill., assignor to Sundstrand Corporation, Wilmington, Del., a corporation of Delaware Application November 29, 1927, Serial No. 236,575. Renewed May 2, 1932

33 Claims. (Cl. 235—60)

This invention relates to computing machines comprising two or more counters, registers or totalizers. Among the objects of the invention are to provide a machine of this class which shall be adapted for direct subtraction as well as addition; to provide a machine in which any of the counters may be used for direct subtraction; to provide improved means whereby all of the counters may be used at the same time, if desired; to provide improved transfer mechanism for use with plural counters; to provide improved means for selecting the counter or counters to be used; to provide means for preventing operation of said selecting means after the subtraction key has been depressed; to provide means in connection with the counter-selecting means to compel the taking of a blank stroke before the total accumulated in the selected counter is printed; and to provide improved means for printing signals to indicate the nature of the various amounts printed on the sheet or tape, as, for example, to show whether the item has been added or subtracted or non-added, to show in which counter the item was added or subtracted, to denote whether a given total is a subtotal or a final total, to indicate from which counter the total was obtained, to show whether the total is a positive or a negative amount, and to indicate that the respective counters are clear.

In the accompanying drawings, which illustrate one of various possible embodiments of the invention, Figure 1 is a fragmental vertical sectional view of the machine, the latter being at rest or initial position, and being set for use of both counters.

Fig. 2 is a plan view of the keyboard.

Fig. 3 is a fragmental right-hand side elevation, the parts being in the same condition as in Fig. 1.

Figs. 4 and 5 are detail views of the link 141 and one of the levers 139, respectively.

Figs. 6 and 7 are detail views of the links 137 and 137ª comprised in the means for moving the counters into and out of mesh with the racks.

Fig. 8 is a vertical sectional view of the computing mechanism, the mechanism being set for use of both counters, and both counters being clear.

Fig. 9 is a detail view of one of the transfer members.

Fig. 9ª is a detail view of one of the rack-supporting pawls.

Fig. 10 is an underside view of one of the rack-guiding bars.

Fig. 11 is an elevation of the upper counter, looking from the front of the machine.

Fig. 12 is a plan section of the lower counter and the transfer mechanisms, the racks being omitted.

Fig. 13 is a similar view of the upper counter.

Fig. 14 is a perspective view of one of the parts comprised in the means for maintaining the upper computing mechanism in position for the printing of a positive total.

Fig. 15 is a fragmental perspective view of the upper computing mechanism, illustrating the means for automatically introducing the "fugitive 1".

Fig. 16 is a fragmental side view of certain of the parts of said means.

Fig. 17 is a fragmental side elevation of the machine, the handle being on the return stroke, printing having just been effected, and addition being about to occur in both counters.

Fig. 18 is a detail view of a slide comprised in the means for moving the counters into and out of mesh with the racks.

Fig. 19 is a detail view of a cam included in said means.

Fig. 20 is a fragmental side elevation, the handle being on the return stroke, an item having just been printed, and said item being about to be subtracted in both counters.

Fig. 21 is a fragmental side view of the means for shifting the counter-reciprocating means from adding position to subtracting position and vice versa.

Fig. 22 is a fragmental transverse view of certain parts comprised in the signal-printing means.

Fig. 23 is a side view of one of the parts shown in Fig. 22.

Fig. 24 is a side view of the signal-printing means.

Fig. 25 is a fragmental rear edge view of the signal-printing type bar.

Figs. 26 and 27 are detail views of parts comprised in the signal-printing means.

Fig. 28 is a detail view of a bell crank comprised in the means for selecting the counter or counters to be used.

Fig. 28ª is an upper edge view of said bell crank.

Fig. 29 is a fragmental view of one of the parts comprised in the signal-printing means and in the means for locking the counter-selecting means.

Fig. 29ª is a fragmental view of another element included in the signal-printing means.

Fig. 30 is a fragmental view of the total-taking mechanism.

Fig. 31 is a fragmental side elevation of the machine, a final total being about to be taken from the lower counter.

Fig. 32 is a detail view of one of the parts comprised in the total-taking means.

Fig. 33 is a fragmental side elevation of the means for selecting the counter or counters to be used, and illustrating the position assumed when the lower counter is in use for addition or total-taking.

Fig. 34 is a similar view, but showing the position assumed when the upper counter is in use for addition or total-taking.

Fig. 35 is a fragmental side elevation, the sub-total key having been depressed preparatory to taking a subtotal from the upper counter.

Fig. 36 is a fragmental view of certain parts shown in Fig. 35.

Fig. 36a is a view of certain parts comprised in the means to enforce the taking of a blank stroke.

Fig. 36b is a view of other parts included in said means.

Fig. 37 is a fragmental left-hand side elevation of the machine.

Fig. 38 is a fragmental plan view.

Fig. 38a is a front end view of the link 341.

Fig. 39 is a fragmental right-hand side elevation of certain means for controlling the upper counter.

Fig. 40 is a fragmental plan view of the means for enforcing the taking of a blank stroke.

Fig. 41 is a fragmental front end view of the machine.

Fig. 42 is a view of a specimen of work produced upon the machine, and illustrating the capabilities of the latter.

The invention is herein disclosed as embodied in a machine of the general character disclosed in the Sundstrand Patent No. 1,198,487 and in my application Serial No. 670,665, filed October 25, 1923, although it will be understood that the invention is not limited to machines of that type. Reference may be made to the above mentioned patent and application for an understanding of features not fully illustrated or described herein. (British Patent No. 223,866 corresponds to said U. S. application Serial No. 670,665.)

The machine herein described is especially designed for bookkeeping work, but various features of the machine are adapted for use in plain listing.

The sheet or tape on which records are to be made may be supported by means including a cylindrical platen 2. The printing of numerals is effected by means of vertically reciprocatory type bars 3 which are raised and lowered by means including arms 10 loosely mounted on a shaft 12.

Rigid with each arm 10 is an arm 13 which is yieldingly connected through helically coiled contractile springs 14 to a rod 15. The latter is carried by two side members 16, one at each side of the machine, said side members being guided for approximately vertical movement by a transverse rod 17 (Fig. 17) fixed in the framework of the machine, said rod extending through elongated openings 18 in the side members 16. Pivoted to the ends of the side members 16 are two levers 19 (Figs. 17, 37 and 39) which are mounted in the framework of the machine to swing on the axis 19a (Fig. 1). Links 23 (Figs. 1 and 37) are pivoted at 23a to the lower ends of the levers 19, the forward ends of said links being pivoted to two crank arms 24 and 25 fixed to opposite ends of the main rock shaft 26. The shaft 26 is arranged to be rocked by means of a handle or crank 27 mounted to swing upon the axis 28, said handle being connected to the arm 24 by suitable means, as, for example, that disclosed in the Sundstrand Patent No. 1,611,390. It will, of course, be understood that an electric motor may be used to rock the shaft 26, if desired.

When the operator pulls the handle 27 forward, the crank arms 24 and 25 swing upwardly, thereby drawing the lower ends of the levers 19 forwardly and moving the side members 16 and the rod 15 downwardly. The movement of the rod 15 is yieldingly transmitted through the springs 14 and the arms 13 and 10 to such of the bars 3 as are at liberty to rise. When the operator releases the handle upon the completion of the forward stroke, means of any usual or preferred character return the handle to its normal position (shown in dotted lines in Fig. 1). The means for restoring the type bars to their normal down position may be of any well known or preferred construction, as, for example, that disclosed in my application Serial No. 670,665, said means including a universal bar 29.

The means herein shown for limiting the extent to which the type bars 3 may rise and thus determining which numerals shall be brought to the printing position, comprises a stationary group of stops 42 (Fig. 1), such as those described in the Sundstrand Patents Nos. 1,198,487 and 1,583,102. As fully disclosed in Patent No. 1,583,102, those type bars 3 which are not needed in printing a given item are prevented from rising when the handle is pulled forward, by a detent plate 48a (Figs. 35 and 40) guided to move in a horizontal plane, said plate being connected through a bar 48b to a rigid frame 48c (Figs. 3, 35 and 40). The frame 48c is mounted to swing on the axis 48d and is normally impelled forward by contractile springs 48e, only one of which is shown in the present drawings. When the detent plate 48a is in its rearward position it overlies pins 46 (Figs. 1 and 35) connected to the numeral type bars 3 and thus prevents the printing of a total.

The keyboard is shown in Fig. 2. 49 are the numeral keys by means of which numbers are set up in the group of stops.

As shown in Fig. 8, the computing mechanism comprises two counters located between two sets of racks. Each counter comprises a series of pinions 125 rotatably mounted upon a transverse shaft 126. The shaft 126 is supported for sliding movement to carry the counter into and out of engagement with the racks. For this purpose the ends of the shaft are extended through elongated openings 127 (Figs. 11 and 12) in plates 128 which form part of the stationary framework of the machine. Each counter is arranged to be moved into mesh with either set of racks 129 and 130, but both counters are never in mesh with the racks 129 at the same time, nor are both counters ever in engagement with the racks 130 at the same time.

The upper counter is rotated by the racks 130 in addition and positive total-taking, and by the racks 129 in subtraction and negative total-taking. The lower counter is rotated by the racks 129 in addition and positive total-taking and by the racks 130 in subtraction and negative total-taking.

The upper end of each rack is attached to a rearwardly extending portion 131 (Figs. 1 and 8) on one of the type bars 3 by means of a headed pin or stud 132 extending through a vertically elongated opening 133 in the rack. A contractile spring 134 attached at its upper end to the rack at 134ᵃ and at its lower end to a downwardly extending portion 135 of the type bar tends to move the rack downwardly with relation to the type bar one tooth space for transfer purposes. The backs of the racks slide in grooves 136ᵃ (Fig. 10) in a stationary guide bar 136 (Fig. 8). The portion 134ᵃ of the rack being virtually a short lever arm, the spring 134 tends to turn the rack on the stud 132 as a pivot and thus serves to hold the rack in place in its guide groove 136ᵃ. However, in order to prevent the rack from being pulled out of place in case the pinion teeth should stick thereto when the pinion is being moved to central position between the sets of racks, I provide a bar 136ᵇ (Fig. 8) fixed in the framework and extending adjacent to and transversely of the racks.

Each counter is moved into and out of mesh with the racks by means of two links, one on each side of the counter, the links for the upper counter being marked 137 in Figs. 3, 6, 8, 31 and 37, and the links for the lower counter being designated as 137ᵃ in Figs. 3, 7, 8, 31 and 37. The forward ends of said links have bearings 137ᵇ to receive the ends of the shafts 126. The rear ends of the links 137 are pivoted at 138 to the lower arms of two levers 139 (Figs. 3 and 5) which are rigidly secured to a shaft 140 journaled in the framework of the machine. Similarly the rear ends of the links 137ᵃ are pivoted at 138ᵃ to the upper arms of two levers 139ᵃ which are rigidly secured to a shaft 140ᵃ journaled in the machine frame.

When the lever 139 or 139ᵃ is in upright position, the corresponding counter is in neutral position. When the lever swings clockwise out of such upright position the counter moves into mesh with one set of racks. When the lever swings counterclockwise out of upright position the counter moves into mesh with the other set of racks.

The means for swinging the levers 139 and 139ᵃ into and out of upright position, to move the counters into and out of mesh with the racks, comprises two links 141 and 141ᵃ (Figs. 3, 4, 17, 20, 31 and 34). In the forward end of each of said links is an elongated opening 142 to receive headed studs 143 on a slide 144 (Fig. 18).

The slide 144 is suspended for reciprocation longitudinally of the machine by means of two links 145 (Fig. 3) which are pivoted at their lower ends to the slide at 146 (Fig. 18) and are pivoted at their upper ends to the right-hand plate 128. The lower portion of the slide 144 is held against lateral displacement by means of a rod 147 (Fig. 17) having a peripheral groove 148 therein to receive the portion 149 of the slide. The forward portion of the slide 144 is pivoted at 150 (Figs. 3, 17, 18, 20 and 31) to a link 151 which in turn is pivoted to a bracket 152 which is pivoted to the framework of the machine at 153.

The rear end of the link 141 (Fig. 4) is provided with notches 154 and 155 (Fig. 3) to receive pins 156 and 157, respectively, on opposite ends of the right-hand lever 139. Rearwardly of the notches 154 and 155 are lugs 158 and 159, respectively, which serve to prevent disengagement of the lever 139 from the link 141. Forwardly of the notches 154 and 155 are curved surfaces $x$ adapted to slide in contact with the pins 156 and 157. The rear portion of the link 141ᵃ is similar to the corresponding portion of the link 141 and the same reference numerals are used in the drawings, with the addition of the exponent $a$. The pins on the right-hand lever 139ᵃ are designated 156ᵃ and 157ᵃ.

The rear ends of the links 141 and 141ᵃ move vertically in unison into and out of engagement with the pins 156, 157, 156ᵃ and 157ᵃ, said links being connected by means of a cross link 160 (Figs. 3, 17, 20 and 31).

The links 141 and 141ᵃ are moved forward and back by means including an oscillatory cam plate 161 (Figs. 17, 19, 20, 31 and 35) having a cam slot 162 therein, the upper portion of said slot being concentric with the axis 163 of said cam plate. On the forward end of the link 151 is a roller 164 that lies in the slot 162. A contractile spring 165 (Fig. 3) connected to the bracket 152 and to the machine frame holds the roller 164 against the front wall of the cam slot 162. The tension of the spring overcomes the weight of the cam 161 and the bracket 152, and thus prevents the weight of these parts from causing the counters to move out of central position.

The means for oscillating the cam 161 comprises a pawl 166 (Figs. 17, 20 and 35) which is pivoted at 167 upon a plate 168 that is rigidly secured to the arm 24. A contractile spring 169 is connected at one end to an extension of the pawl 166 and at its other end to the plate 168. The pawl 166 has a shoulder 166ᵃ to engage a pin 170 set in the cam 161 at one side of its axis 163, and another shoulder 166ᵇ adapted to engage a pin 171 fixed in the cam 161 on the opposite side of its axis. There is a guide finger 172 on the pawl between the shoulders referred to, said guide finger extending into the space between the pins 170 and 171 so as to strike said pins as the arm 24 swings, whereby the pawl is swung to one side or the other of its pivot.

When a number is to be added or subtracted the pawl 166 is permitted to engage the pins 170 and 171 so as to swing the cam 161 to effect movement of the counter or counters into and out of mesh with the racks.

When a total is to be printed, the pawl 166 is not permitted to engage the pin 170, consequently the cam 161 is not moved during the forward stroke of the handle 27, and the counter from which the total is to be printed remains in mesh with the racks during the rising of the latter, thereby effecting the positioning of the type bars for the printing of the total.

The means for controlling engagement of the pawl 166 with the pin 170 comprises an arm 173 (Fig. 35) pivoted at 174 in the machine frame, the upper end of said arm having an angular lug 175 adapted to hold the pawl 166 out of position to engage said pin. In the arm 173 is an elongated opening 176 in which lies a pin 177 fixed to the swinging frame 48ᶜ. As explained in the Sundstrand Patents Nos. 1,198,487 and 1,583,102, after a spacing or total cycle and until a number has been set up in the group of stops 42, the frame 48ᶜ is in its forward position. As soon as a digit is set up in the machine the frame 48ᶜ swings back, thereby swinging the arm 173 rearwardly away from the pawl 166 and leaving said pawl in position to engage the pin 170 when the handle 27 is pulled. When a total is to be printed, the frame 48ᶜ is in its forward position, and the pawl 166 is held out of engagement with the pin 170, consequently the cam 161 is not moved during the forward stroke of the handle 27, and the counter remains in mesh with the racks during the rise of the latter, thereby effecting the positioning of the type bars for the printing of the total.

In the construction herein shown, the taking of a subtotal is not automatically effected by merely pulling the handle 27. A subtotal key 180 (Figs. 3, 31 and 35) has been provided, on the stem of which key is a pin 181 that overlies an arm 182 which is pivoted at 183. Rigid with the arm 182 is an arm 184 to which is pivoted the forward end of a slide 185. The rear end of said slide is guided by a guide member 186 fixed to the main frame of the machine and by a grooved collar 187 on the rod 147. The slide 185 comprises a lug 188 (Fig. 36) which lies in front of a pin 189 on the swinging frame 48ᶜ. A spring 190 acting upon the arm 182 tends to move the slide 185 rearwardly so as to swing the frame 48ᶜ rearwardly against the tension of the springs 48ᵉ to place the detent plate 48ᵃ in position to prevent the type bars from rising. It will be seen that in order to take a subtotal it is necessary to depress the subtotal key 180 so that the springs 48ᵉ may be permitted to move the detent plate 48ᵃ out of the position in which it prevents the type bars from rising.

To hold the subtotal key 180 depressed I provide a lever 191 (Fig. 35) which is pivoted on the axis 183, said lever being forked at 192 to receive a pin 193 on the stem of the subtotal key. The lever 191 extends forward into position to underlie a finger 194 which is fixed to one end of a pivot shaft 195. On the other end of the shaft 195 is a finger 196 (Fig. 37) which is acted upon by a contractile spring 197. The lower end of the finger 196 normally bears against a roller 198 carried by a slide bar 199 that corresponds to the slide bar 72 of Patent No. 1,198,487. In the return stroke of the handle the bar 199 is moved forward far enough to release the lever 191, whereupon the subtotal key 180 is restored to its upward position. It will be understood that if desired, means may be provided for permanently holding the subtotal key 180 depressed, in which event subtotals will be obtained automatically, as described in Patents Nos. 1,198,487 and 1,583,102 after the taking of a spacing stroke of the handle 27.

When the operator wishes to take a final total the counter is withdrawn from the racks before the latter descend. The means for swinging the cam 161 to effect such movement of the counter comprises a lever 200 (Figs. 17, 20 and 35) pivoted on the shaft 26 and having a cam slot 201 in which lies a roller 202 on the cam 161. The lever 200 has an arm 203 which is arranged to be engaged by a pin 204 on the arm 24. The means for swinging the lever 200 forward to disengage the counter from the racks is controlled by a total key 205 (Fig. 31) having a stem 206. On the stem 206 is a lug 206ᵃ (Fig. 30) adapted to be engaged by the latch finger 194 to latch the total key down. On the stem 206 is an angular lug 207 (Fig. 30) that overlies the arm 182. The key stem 206 also has a stud 208 that underlies the forward end of a lever 209 (Fig. 31). Said lever has an elongated opening 210 through which a pivot rod 211 extends, the lever 209 thus being movable longitudinally to a slight extent. A contractile spring 212 tends to slide the lever 209 rearwardly. 213 is a contractile spring stretched between a pin on the stem 206 and the front end of the lever 209, said spring tending to hold the pin 208 and the lever 209 in contact with each other. During the printing of an item and during the enforced blank or spacing stroke prior to the taking of a total, the lever 209 is held against movement by the spring 213 by means comprising a cam plate 214 (Fig. 31) which is pivoted adjacent the rear end of the machine at 215 and is acted upon by a contractile spring 216. On the rear end of the lever 209 is a pin 217 underlying the cam plate 214. The surface 214ᵃ of the cam plate 214 is arranged to be engaged by a stud 218 on the inner side of the right-hand lever 19. The movement of the cam plate 214 under the influence of the spring 216 is restrained at times by a detent arm 219 (Figs. 31 and 35) pivoted at 220 in the framework of the machine. A contractile spring 221 normally holds the lower edge 219ᵃ of the arm 219 in contact with the stud 218. On the detent arm 219 is a pin 222 adapted to engage a hook 223 on the cam plate 214. At times the detent arm 219 is prevented from moving (under the influence of the spring 221) into position where the pin 222 is in front of the hook 223, by means of a pin 224 on an arm 225 which is rigid with the arm 173. The upper end of the detent arm 219 is cut away so as to clear the pin 224 when the arm 175 is in its rearward position (as it is when an item has been set up or an enforced blank stroke is to be taken).

A detent plate 226 (Fig. 32) pivoted on the center 215 has a cam slot 227 having a dwell portion 228 in which the stud 218 is arranged to run. That portion of the pin 217 which projects from the inner side of the lever 209 underlies the plate 226. In the lower edge of the plate 226 is a notch 229.

It will be remembered that the stud 218 is connected to swing back and forth with the handle 27. Even if the total key 205 were held depressed while the handle was being drawn forward to print an item or take an enforced blank stroke, the lever 209 would be held against movement by the spring 213 by the cam plate 214 overlying the pin 217; the spring 216 in turn being prevented from moving the cam plate 214 by means of the pin 222. But after the blank stroke has been taken, the swinging frame 48ᶜ and consequently the arm 225 are in their forward positions (as shown in Fig. 35), and therefore if the total key 205 be depressed the cam plate 214 is free to swing counterclockwise as the stud 218 moves forward, away from the edge 214ᵃ, in the forward stroke of the handle 27, until the pin 217 on the rear end of the lever 209 has risen under the influence of the spring 213 until said pin 217 is in a locking notch 230 in the cam plate 214. The parts are then in the position shown in Fig. 31, the handle 27 being at the end of its forward stroke, the spring 213 having drawn the forward end of the lever 209 down against the pin 208. The pin 217 does not enter the notch 230 until the movement of the cam plate 226 under the action of the stud 218 has brought the notch 229 into register with said pin 217, whereupon the spring 213 causes the pin 217 to enter the notches 229 and 230. Very shortly after the handle 27 has commenced its return stroke the stud 218, acting on the walls of the cam slot 227, swings the plate 226 downwardly, thus pushing the pin 217 and the lever 209 forwardly. On the lever 209 is a shoulder 231 (Fig. 31) which moves into place directly behind a pin 232 on the lever 200 when the lever 209 is tilted by the spring 213. When the lever 209 is pushed forward by the plate 226 the shoulder 231 pushes the lever 200 forward, thereby swinging the cam 161 upwardly, and thus pulling forward the slide 144 and the link 141 or 141ᵃ as the case may be, and consequently moving the counter out of mesh with the racks. As before indicated, this occurs during the early part of the return movement of the handle 27 and before the racks descend, the pinions being therefore left standing at zero.

As the stud 218 continues on its return stroke, it strikes the edge 214ª and swings the plate 214 against the tension of the spring 216, the lower edge of said plate positively camming the pin 217 down and thus (in conjunction with the spring 212) restoring the lever 209 to its initial or inoperative position. As the arm 24 returns to its initial position the pin 204 thereon engages the arm 203 and restores the lever 200 to its initial position (see Fig. 35).

Non-add mechanism of any preferred character may be employed as, for example, that disclosed in my application Serial No. 670,665. Herein the total key 205 also serves as the non-add key.

The transfer mechanism is best shown in Figs. 8 to 16. There is a set of transfer devices associated with the racks 130 to carry amounts from one numerical order to the next higher order, and a similar set of transfer devices for the racks 129. It has been stated that the type bars are moved to their normal lower position by the rod 29 (Fig. 1). The extent of the downward movement of the type bars is determined by the extent of downward movement of said rod. The extent of downward movement of the tens and higher racks is limited (except in the transfer operation) by contact of lugs 235 (Fig. 8) on the racks with stop lugs 236. When an amount is to be transferred from one order to the next higher order the stop lug 236 for the rack belonging to such higher order is withdrawn, thereby allowing that rack to descend under the action of its spring 134 until its lug 235 stops against the cross bar 237 fixed in the machine frame. The extent of such further descent of the rack is just sufficient to turn the pinion for that rack through the distance of one tooth. Each stop lug 236 is formed on an arm or pawl 238 (Figs. 8 and 9ª) which is suspended from a pivot 239 in the machine frame. Since both counters are never in mesh with the same set of racks at any given time, it is practicable to arrange for the tripping of the pawls 238 by either counter. This is effected by means including transfer members 240 (Figs. 8 and 9) each having an upper lug 241 adapted to be engaged by lugs 242 on a pinion in the upper counter, and a lower lug 241 arranged to be engaged by a pinion in the lower counter. In the present instance, two diametrically opposite lugs 242 are fixed to each pinion because each pinion has twenty teeth. For the sake of uniformity in manufacture, the pinion of highest order in the upper counter is provided with tripping lugs 242, as shown in Fig. 13, although there is no rack to be moved through the medium of such lugs. As indicated in Fig. 13, the upper lug 241 is omitted from the member 240 that would otherwise be tripped by the pinion of highest order.

The lower ends of the transfer members 240 are mounted upon cross rods 243, and their upper ends have elongated openings 244 to receive headed studs 245 carried by the pawls 238. Individual springs 246 tend to pull the transfer members 240 in the direction to withdraw the stop lug 236 from under the lug 235. The spring 246 is normally restrained by reason of engagement of a shoulder 247 (Fig. 9) on the transfer member 240 with the bar 237. It may be here stated that the bars 136 and 237 have horizontal slots 248 (Fig. 10) therein to prevent lateral displacement of the transfer members 240. The springs 246 normally hold the members 240 up in the position shown in Fig. 8.

When the amount registered by a pinion reaches "9", continued rotation of the pinion as the rack descends brings one of the lugs 242 on the pinion against the lug 241 on the transfer member which is connected to the pawl 238 for the next higher rack, thereby depressing the transfer member 240 until the shoulder 247 is clear of the bar 237, whereupon the spring 246, assisted by the downward pressure of said next higher rack, pulls the transfer member 240 and the pawl 238 away from the last-mentioned rack until the transfer member 240 stops against a restoring rod 249. The lug 236 is then out of the path of said rack of next higher order, and the latter therefore moves down one tooth-space under the influence of its spring 134, the rack being stopped by the bar 237.

After each transfer operation the pawl 238 and the transfer member 240 are restored to their normal position by the rod 249, there being one such restoring rod for each of the sets of transfer mechanisms. Each rod 249 is carried by two bell crank levers 250 which are pivoted in the framework of the machine on the axis 239. The bell crank levers at each side of the machine are connected for simultaneous swinging movement by a pin-and-slot connection, as shown at 251 in Fig. 8. The restoring rods 249 are simultaneously moved toward and away from each other by means of two arms 252 each formed integral with one of the bell crank levers 250, said arms 252 extending into the space between the side members 16 (Figs. 17 and 20). A rod 253, the ends of which lie in elongated openings 254 in the side members 16, is normally held against the lower end walls of said openings by means of two springs 255. When the side members 16 move downwardly in the forward stroke of the handle 27, the rod 253 is carried into engagement with the arms 252, thereby causing the rods 249 to move toward each other to restore any transfer members 240 and pawls 238 which may have been concerned in a previous transfer operation. When the side members 16 rise, a contractile spring 256 (Fig. 8) returns the rods 249 to the normal position shown in said view. Such normal position is determined by contact of one of the bell crank levers 250 with one of the bars 136ᵇ.

When the type bars are raised for a printing operation, the racks do not begin to rise until the studs 132 engage the upper ends of the elongated openings 133. Those racks, however, which have descended below the normal position in order to effect transfers, rise practically simultaneously with the type bars and thus are lifted before the stop lugs 236 are restored to normal position by the rods 249. So also the movement imparted to the type bars during the enforced spacing stroke of the handle 27 is sufficient to raise the lugs 235 to permit the placing of the stop lugs 236 thereunder.

It may be here stated that when any pinion stands at zero, one of the lugs 242 on said pinion lies directly beneath one of the lugs 241 (see Fig. 8). Therefore, when a total is to be printed, those racks which mesh with pinions that stand at zero cannot rise, the remaining racks rising until the rotation of their pinions brings the lugs 242 thereon into contact with their respective lugs 241. The type bars are then in position to print the total amount accumulated on the counter.

It will be noted that the transfer members 240 are arranged for pivotal movement on the axis of the rods 243, and are arranged for downward movement to disengage the shoulder 247 from the cross bar 237. Each rod 243 is located relatively close to the vertical planes of the pinion shafts so that the pivotal movement imparted to the transfer member 240 by the spring 246 shall carry the lower lug 241 away from the adjacent pinion without any rising movement of said lug 241.

Either or both counters may be in use at the same time. The means for determining which counter shall be in use, or whether both shall be used, comprises a slide 280 (Figs. 3 and 33) mounted on the slide 144 for vertical movement with reference to said slide. In the present instance, the slide 280 is guided by means of headed studs 281 on the slide 144, said studs lying within vertically elongated opening 282 in the slide 280. On the upper end of the slide 280 is a cam surface 283 adapted to coact with the forward end of the link 141. The slide 280 also has a cam surface 284 to coact with the forward end of the link 141ª. A contractile spring 285 connected to the link 160 urges the links 141 and 141ª toward the slide 280.

When the slide 280 is in the position shown in Fig. 34, the link 141 is in position to move the upper counter into and out of mesh with the racks 130 as the slide 144 is moved back and forth by the cam 161. The movement of the slide 144 is imparted to the link 141 through the slide 280, the spring 285 holding the forward end of the link 141 against the vertical rear edge of the slide 280. In this adjustment of the slide 280, the link 141ª does not receive any movement from the slide 144, as the lower stud 143 moves idly in the elongated opening 142. The spring 285 holds the link 141ª forward as far as possible, that is to say, the lugs 158ª and 159ª lie in contact with both of the pins 156ª and 157ª, thereby holding the lever 139ª in its upright position, wherein the lower counter is in neutral position.

Fig. 33 shows the slide 280 in its lower position wherein the link 141ª is caused to move with the slide 144 so as to move the lower counter into and out of mesh with the racks 129, the link 141 being idle as explained in connection with the link 141ª in Fig. 34.

Fig. 3 shows the slide 280 in its central position wherein it serves to hold both links 141 and 141ª stationary with reference to the slide 144, the reciprocation of the slide 144 causing the upper counter to move into and out of mesh with the racks 130, and causing the lower counter to move into and out of mesh with the racks 129.

The means for shifting the slide 280 into any of its three positions comprises a member 286 (Figs. 24 and 28) in the nature of a bell crank lever, said member being pivoted on the axis of the rod 147. The member 286 carries a pin 438 (Fig. 28ª) that lies in a horizontally elongated notch 288 (Figs. 24 and 33) in the slide 280. The member 286 is pivoted at 289 to the rear end of a link 290, the forward end of which is pivoted at 291 to a bell crank 292 pivoted at 293. One arm of the bell crank 292 is provided with a finger knob 294. Said arm extends through a slot 294ª (Fig. 41) in a plate which is inscribed to indicate which counters are in use. In the present embodiment of the invention, the lower counter is designated "Counter A" and is in use for addition, subtraction or total-taking when the finger knob 294 is in its upper position. The upper counter is designated "Counter B" and is in use for addition, subtraction or total-taking when the finger knob 294 is in its lower position. When the finger knob is in central position, both counters are in use for addition or subtraction. The adjusting means just described is yieldingly held in any of its three positions by means of a latch 295 (Fig. 24) which is pivoted at 296 on the slide 144. Said latch is provided with three notches 297 to receive a stud 298 on the slide 280. A contractile spring 299 holds the latch 295 yieldingly in engagement with the stud 298.

When the upper counter is used for subtraction, it cooperates with the racks 129. When the lower counter is employed for subtraction, it coacts with the racks 130. Both counters may be used at the same time for addition; or both counters may be used at the same time for subtraction.

It will be noted that in Figs. 3, 17 and 31 the links 141 and 141ª are in engagement with the lower pins 157 and 157ª on the levers 139 and 139ª.

Referring now more particularly to the means for controlling the machine during operations involving subtraction: Such control necessitates the shifting of the links 141 and 141ª into position to engage the upper pins 156 and 156ª on the levers 139 and 139ª. It will be seen that such shifting of the links will cause shifting of the field of reciprocation of the counters so that they move into and out of mesh with the other set of racks. Compare Figs. 1 and 20.

The means for shifting the links 141 and 141ª from the addition plane to the subtraction plane comprises a lever 300 (Fig. 21) pivoted at 301 in the machine frame and having a forked rear end 302 which engages the pin 303 that serves to connect the link 160 to the link 141. The lever 300 has a downwardly extending arm carrying a headed stud 304 (Fig. 38) which extends into a horizontally elongated opening 305 in a link 306. A contractile spring 307 connected at one end to the lever 300 and anchored at its other end to the rear end of the link 306 tends to move the pin 304 against the rear end wall of the slot 305. The spring 307 thus tends to raise the lever 300 so as to shift the links 141 and 141ª into the subtracting position. The spring 307 is controlled by means including a subtraction key 308 (Fig. 20) having a stem 309 which is guided for vertical movement. A contractile spring 310 normally holds the subtraction key elevated. On the stem 309 is a pin 311 that overlies a forwardly extending arm 312 pivoted at 313. The forward end of said arm is arranged to be engaged by the latch finger 194. Rigid with the arm 312 is an upwardly extending arm 312ª having an angular end adapted to overlie a pin 312ᵇ on the stem 309 when the arm 312 is held by the latch 194. Rigid with the arm 312 is another downwardly extending arm 314 to which the forward end of the link 306 is pivoted at 314ª. A contractile spring 315 connected to the arm 314 tends to draw said arm forward. When the subtraction key is depressed the arm 314 is latched by the finger 194 against actuation by the spring 315; thus the subtraction key is held depressed and the link 306 is held in its rearward position, as shown in Figs. 20 and 21, so that through the medium of the lever 300 the links 141 and 141ª are maintained in their upper position.

For the sake of simplicity, I will describe the process of adjusting the machine for subtraction in the upper counter, although the process would be the same were either or both counters in use.

If an item is to be subtracted in the upper counter, the subtraction key 308 is depressed after the item has been set up, thereby pushing the link 306 rearwardly and thus moving the rear end wall of the elongated opening 305 away from the pin 304. (The movement imparted to the link 306 is slightly greater than is necessary to raise the lever 300). When the handle 27 is pulled, the slide 144 is drawn forward, as before explained, to withdraw the upper counter from the racks 130 before the latter rise. The forward movement of the link 141 causes the lever 139 to turn into upright position, as a result of which the pin 156 is brought into register with the notch 154. Thereupon the spring 307 swings the lever 300 upwardly, thus placing the notch 154 in engagement with the pin 156. In the return movement of the handle the link 141 is pushed rearwardly, thereby rocking the lever 139 into the position shown in Fig. 20 to place the upper counter in mesh with the racks 129. At the end of the return stroke of the handle, the latch finger is disengaged from the arm 312, but the spring 315 cannot pull the lever 300 down, because the lower surface $x$ of the link 141 rests upon the pin 157. However, the disengagement of the latch finger 194 from the arm 312 allows the springs 307 and 315 to swing the arm 312$^a$ rearwardly far enough to release the pin 312$^b$, whereupon the spring 310 restores the subtraction key to its normal position.

If the next item is to be subtracted the subtraction key is again depressed and the same cycle of operations performed. If, however, the next item is to be added, the following operations ensue. When the handle is pulled forward to accumulate the item, the lever 139 is turned to upright position, whereupon the spring 315, acting through the arm 314, the link 306, the rear end wall of the opening 305, the stud 304 and the lever 300, moves the link 141 down so as to place the notch 155 in engagement with the pin 157. In the return stroke of the handle the link 141 is pushed rearwardly by the cam 161, whereby the lever 139 is swung in the direction to place the pinions in mesh with the racks 130 as shown in Fig. 1.

If after the debit or positive amount has been accumulated in the upper counter, one or more amounts are subtracted so as to leave a credit or negative total in said counter, the true or negative total cannot be printed until the credit or negative total has been increased by one unit. Similarly, if a credit or negative total in the upper counter be converted into a debit or positive total by the addition of amounts, the correct total cannot be printed without first adding a unit thereto. In other words in order that the correct total accumulated in the upper counter shall be printed it is necessary to introduce a unit into said counter whenever said counter "passes through zero." In order to effect this result automatically, I have provided the means to be now described.

Referring first to the devices associated with the racks 130: The units rack 130 is arranged to be supported in normal position by means of a pawl 317 (Fig. 15) which is pivoted upon the rod 239 and is arranged to support the lug 235 on said units rack. When the "fugitive one" is to be introduced into the upper counter, the pawl 317 is moved out of engagement with the lug 235 on the units rack, whereupon the spring 134 for said rack moves the rack down one tooth-space and thus turns the units pinion the same distance. The means for thus moving the pawl 317 at the time the upper counter passes through zero comprises two diametrically opposite lugs 242 (Fig. 13) on a wheel 318 mounted on the shaft 126 alongside the pinion 125 of highest order. The wheel 318 is fixed to the wheel 125 by means of a stud 319. The lugs 242 on the wheel 318 are arranged to engage a member 320 which, for the sake of simplicity in manufacture, may be and preferably is identical in form with the transfer members 240. The member 320 is shown in Figs. 15 and 16. Its lower end is pivotally and slidably mounted upon the rod 243, and its upper end has a slotted opening 321 to receive a headed stud 322 on the lower arm of a lever 323. The lever 323 is pivotally mounted on the rod 239 and is rigidly connected to the pawl 317 by means of a cross-bar or plate 324.

The units rack 129 is supported in the manner described in connection with the units rack 130 (see Fig. 20). Likewise, there is a member 320 and a lever 323 in position for coaction with the wheel 318 when the latter is in mesh with the racks 129.

Let it be assumed that the amount "3" has been accumulated in the upper counter by operation of the racks 130. The units pinion will therefore stand with one of its lugs 242 three spaces below the zero position at the rear side, the corresponding lugs 242 of the other pinions being in the zero position, i. e., directly beneath the lugs 241. The diametrically opposite lugs 242 are above the horizontal plane of the lugs 241 at the forward side. Assuming that "5" is to be subtracted, the pinions are first moved out of mesh with the racks 130, and after the units rack 139 has been raised to the position for registering "5", the pinions are moved into mesh with the racks 129, whereupon the units rack 129 descends, thus turning the units pinion five tooth-spaces. In the course of such turning movement, one of the lugs 242 on the units wheel is carried into engagement with the lug 241 associated with the tens rack 129, thereby disengaging the shoulder 247 from the bar 237, and thus allowing said tens rack to descend one tooth-space. Said tens rack being in mesh with the tens pinion, the latter is caused to turn through one tooth-space, whereby the lug 242 on said tens wheel trips the lug 241 for the hundreds rack, and so on from pinion to pinion. An impulse is thus transmitted from the units pinion to the wheel 318 so as to place one of the lugs 242 on each pinion except the units pinion directly below the normal horizontal plane of the lugs 241 at the forward side. The rotation thus imparted to the wheel 318 serves to disengage the member 320 from the bar 237, whereupon the spring 246 for said member 320 moves the member 320 and the lower arm of the lever 323 forward. The forward movement of the lower arm of the lever 323 is communicated to the member 317 through the cross bar 324 whereby the units rack 129 is allowed to descend an additional tooth-space, thus introducing the "fugitive 1".

Preferably means is provided to compel the taking of a blank or spacing stroke prior to the printing of a subtotal or a final total. Such means may be similar to that fully disclosed in my Patent No. 1,583,102, dated May 14, 1926.

When there is a credit or negative total (or overdraft) in the upper counter, and said total or overdraft is to be printed, it is necessary that the upper counter be prevented from moving into mesh with the adding racks 130 at the conclusion of the blank or spacing stroke. This result could be effected by holding the subtraction key depressed during the spacing stroke. Inasmuch however, as the operator may not know that the total is negative, means is provided for automatically maintaining the upper computing mechanism in condition for the printing of a negative total. For manufacturing reasons it is convenient to arrange the last mentioned means to operate through the means which is provided in cross-tabulating machines for automatically setting the computing mechanism to perform subtraction. The last mentioned means comprises a member 330 (Fig. 39) in the nature of a lever pivoted at 331 and 332 in the right-hand portion of the machine frame. Said lever has a lower arm 333 (Fig. 38) adapted to engage a lug 334 on the link 306. The lever 19 and hence the lever 330 begin moving as soon as the handle 27 starts forward, hence the rearward movement of the link 306 commences promptly with the beginning of the cycle. The end of the arm 333 which engages the lug 334 is made capable of yielding, as shown in Fig. 38, the rearward movement of the link 306 ceasing well before the end of the forward stroke to give time for the latch finger 194 to engage the arm 312.

The member 330 also comprises an upper arm 335' having a forked end which engages a pin 336 on the right-hand lever 19. It will be seen that the arm 333 will be oscillated every time the handle 27 is operated. In order that said arm shall engage the lug 334 only when the computing mechanism is to be set for subtraction, the member 330 is mounted for vertical movement, gravity normally holding said member in its lower position (wherein the inner end of the arm 333 is below the horizontal plane of the lug 334). Means is provided for raising said member 330 to place the inner end of the arm 333 in the horizontal plane of the lug 334. Said raising means comprises a forwardly extending arm 337 pivoted in the machine frame at 338 and underlying a stud 339 on the member 330. Rigid with the arm 337 is a downwardly extending arm 340 to which the rear end of a link 341 is pivoted at 342. To the forward end of the link 341 is attached a contractile spring 343 which tends to pull the link 341 forward and thus raise the arm 337 and hence the member 330 so as to place the arm 333 in position to set the upper computing mechanism for the printing of a negative total. When an amount is set up by depression of one or more keys 49, the spring 343 is prevented from drawing the link 341 forward, by means of a stop finger 344 fixed to the right-hand end of the rock shaft 195, inasmuch as the spring 197 (Fig. 37) turns said shaft so as to raise the stop finger 344 into the path of a lug 345 (Fig. 38ª) on the link 341. When no amount is set up in the keyboard (as is the case when a total is to be printed) the roller stud 198 (Fig. 37) holds the stop finger 344 down out of the path of the lug 345, the spring 343 being then restrained by reason of the fact that a roller stud 346 (Fig. 39) mounted on the axis 23ª normally lies in front of a lug 347 on the arm 340. When the handle is drawn forward to effect printing of the total, the roller stud 346 moves forward, thus allowing the spring 343 to draw the link 341 forward, and thus lifting the arm 337 and the member 330, whereby the upper computing mechanism is maintained in position to print a negative total.

When the upper counter contains a positive total, the spring 343 must be prevented from acting, this result being automatically effected by the means to be now described.

A stop arm 348 pivoted in the machine frame at 349 has a shoulder 350 that lies in front of a lug 351 on the arm 340 and thus restrains the spring 343 when said stop arm is in its upper position. The position of the stop arm depends upon the nature of the total accumulated in the upper counter, said arm being in its upper position when there is a positive total in said counter, and being in its lower (ineffective) position when the total is negative. Motion is transmitted from the levers 323 (Figs. 8, 15 and 39) to the stop arm 348 by means of a link 352 having elongated openings 353 to receive headed studs 354 on the levers 323. The rear end of the link 352 is pivotally connected to an arm 355 (Figs. 8 and 14) which is pivoted at 356 in the machine frame. Rigid with the arm 355 is an arm 357 to which is fixed a bar 358 that is pivoted to the rear end of the stop arm 348 at 359. The stop arm 348 is yieldingly held in adjusted position by means of a latch 360 (Fig. 8) which is pivoted at 361 in the machine frame and which has two notches 362 in either of which the upper edge of the arm 355 is adapted to lie. A contractile spring 363 keeps the latch pressed against the arm 355.

When the forward pawl 317 is tripped to introduce the fugitive unit into the upper counter at the time the latter passes from the positive to the negative condition, the link 352 is pushed rearwardly (the stud and slot connection preventing interference with the rear pawl 317), thereby lowering the stop arm 348, and thus leaving the spring 343 free to function at the proper time in the cycle. If addition subsequently occurs and the upper counter passes from the negative to the positive condition, the rear pawl 317 will be tripped to introduce the fugitive unit, thereby pushing the link 352 forward and thus raising the stop arm 348 into position to restrain the spring 343.

Suppose that credits have been accumulated in the upper counter so that there is a credit total in that counter. The mechanism shown in the right-hand portion of Fig. 39 will have operated so as to place the stop arm 348 in its lower position, as shown in said figure. Also assume that there are some debits to be accumulated in the lower counter. The finger piece 294 is moved up into its uppermost position. As soon as a digit is set up in the keyboard, the stop finger 344 rises into position to restrain the spring 343 from conditioning the mechanism to place the lower counter in mesh with the rear racks 130. A lever 370 (Fig. 39) pivoted at 371 in the machine frame has a pin-and-slot connection at its forward end with the lever 292. When the lever 292 is in its uppermost position, the rear end of the lever 370 is in the path of a pin 372 on the link 341, and consequently the spring 343 is prevented from moving the link 341 forward when the handle stroke is taken. The lever 370 and the pin 372, however, are needed only during a spacing cycle and a totaling cycle in the taking of a total from the lower counter while the stop arm 348 is in its lower position, the finger 344 being ineffective during spacing and totaling cycles. After accumulating the debits in the lower counter, the latter will stand in mesh with the front racks 129. The upper counter will be in neutral position. Let us assume further that the total contained in the upper counter is to be printed. The lever 292 is swung down into its lowermost position, thereby placing the rear end of the lever 370 above the path of the pin 372. The handle is then pulled forward, whereupon the spring 343 pulls the slide 341 forward into the position shown in Fig. 39, whereby the member 330 is lifted so that, during the forward stroke of the handle, the end 333 of said lever engages the stud 334 and pulls the link 306 rearwardly so as to raise the links 141 and 141ª into the position shown in Fig. 20. In the return stroke of the handle, the links 141 and 141ª are actuated to place the upper counter in mesh with the forward racks and to move the lower counter into neutral position. The type bars are prevented from rising by reason of the fact that the detent plate 48ª is in its rearward position. If one of the total keys be now depressed and the handle again pulled, the credit total accumulated on the upper counter will be printed.

If it is now desired to print the debit total accumulated upon the lower counter, it is necessary to insure that the lower counter shall move into mesh with the forward racks at the proper time, since the link 141ª is in its upper position and therefore in position to reciprocate the lower counter into and out of mesh with the rear racks. Means is therefore provided to insure that a blank stroke of the handle shall be taken before the total is printed from the lower counter, such blank stroke of the handle serving to allow the links 141 and 141ª to move into their lower position. The means for compelling a spacing stroke at such a time comprises a stud 375 (Figs. 35 and 40) carried by the lever 292 in position to engage the lower edge of a lever 376 fixed upon a rock shaft 377. Attached to said shaft is a downwardly extending arm 378 (Fig. 35), to the lower end of which is pivoted a slide 379 (Fig. 36ᵇ). The rear portion of said slide is supported upon a pin 380 carried by a stationary portion of the machine frame, said pin extending through a horizontally elongated opening 381 in the slide. The rear end of the slide carries a yieldingly mounted finger 382, said finger being pivoted at 383 and being yieldingly held in normal position by means of a spring 384, the normal position of the finger being determined by contact of a lug 385 with a pin 386 on the slide. The upper end of the finger 382 lies in front of a plate 387 (numbered 300 in my Patent No. 1,583,102). When the lever 292 is swung into its uppermost position, the stud 375 lifts the lever 376, thereby causing the finger 382 to push the plate 387 rearwardly and thereby pushing the detent plate 48ª into its rearward position where it overlies the pins 46 and prevents the printing of a total. When the lever 292 was swung into its uppermost position the lever 370 was placed in front of the pin 372 on the link 341, thereby preventing the spring 343 from moving the link 306. Upon now pulling the handle 27, the spring 315, acting through the arm 314, the link 306 and the lever 300, places the link 141ª in its lower position, and upon the return stroke of the handle the link 141ª is actuated to place the lower counter in mesh with the front racks. Now upon taking a second stroke of the handle, the debit total accumulated in the lower counter is printed.

When the counter-selecting lever 292 is in its middle position, the stud 375 lies under the beveled end of the lever 376, thus holding the finger 382 yieldingly pressed against the plate 387. If an attempt were now made to put the machine through a total-taking cycle, the plate 387 would be swung forward by the crank arm 25, as described in Patent No. 1,583,102, on the forward stroke of the spacing cycle, but the detent plate 48ª would be held in its rear effective position by the upward pressure of the stop pins 46 against said detent plate and by reason of the fact that the pin 224 (Fig. 35) then lies within the hook of the lever 219; and on the return stroke in the spacing cycle the spring 384 (Fig. 36ᵇ) would restore the plate 387 to its rear effective position. This sequence of operations would be repeated as often as the handle was operated, the taking of a total being thus impossible while the counter-selecting lever is in its middle position.

It will be seen that the shifting of the counter-selecting lever 292 from its upper to its lower position or from its lower to its upper position will operate the lever 376, and thus prevent the taking of a total from either counter after the taking of a total from the other counter, without an intervening blank cycle. Such blank-cycle-enforcing means is desirable because a single counter-conditioning cam 161 is employed; while a total is being taken from one counter the other counter is in neutral position, and before a total can be taken from such other counter a blank cycle must be performed to enable the cam 161 to condition such other counter for totaling.

Summarizing the description of certain controls which are effective in totaling operations: In the present machine, only the upper counter is provided with means for automatically introducing the fugitive unit, hence only the upper counter is capable of automatically giving a correct negative total. The fugitive-unit-introducing means controls (through the parts 355, 358 and 348 shown in Figs. 8, 14 and 39) a mechanism (the parts 343, 341, 340, 339, 336, 330, 306, 300 and 303 shown in Figs. 21, 38 and 39) which tends to condition the machine for the taking of a negative total. But said mechanism 300 etc. is connected to both of the links 141 and 141ª (Figs. 20 and 33) through the stud 303 and the link 160; hence, when there is a negative total in the upper counter, the mechanism 300 etc., tends to condition the machine for negative totaling, even though the lower counter has been selected for addition or subtraction or totaling. To prevent the lower counter from being automatically placed in mesh with the rear racks 130 for a negative operation under such circumstances, I provide the finger 344 (Fig. 39) which is effective in adding and subtracting operations, and a lever 370 which is effective in blank cycles and total-taking cycles. I also provide means (376 etc.) to enforce a blank cycle of the machine after a total has been taken from one counter and before a total is taken from the other counter.

The signal printing means comprises a type bar 400 (Fig. 24) carrying signal-printing types as indicated in Fig. 25. Said type bar is mounted alongside of the numeral-printing type bars and is guided for vertical reciprocatory movement, being raised and lowered as described in connection with the other type bars.

The means for limiting the upward movement of the signal type bar 400 so that it shall print the proper signal includes a detent 401 (Fig. 27) which is pivoted in the machine frame on the axis 402. A contractile spring 403 (Fig. 24) holds the detent 401 in the normal position determined by the engagement of a lug 404 on said detent with a pin 405 on the bell crank 286 (Figs. 28 and 28ª). The detent 401 is effective only when the lever 292 is in its lowermost position, as it is when the upper counter is in use. The surface 406 on the detent 401 is then in position to be engaged by an angular lug 407 on the lower end of the signal type bar 400 so as to limit upward movement of said type bar to the extent necessary to bring the upper type to the printing line. Said type prints the debit total or clear signal and the non-add signal for the upper counter.

The means for limiting upward movement of the signal type bar 400 further includes a detent 408 (Figs. 22, 24 and 26) also pivoted in the machine frame on the axis 402 to swing independently of the detent 401. The detent 408 is provided with eight stop shoulders 409, 410, 411, 412, 413, 414, 415 and 416 adapted for engagement by the lug 407. The signals that may be printed when the various stop shoulders are in vertical alinement with the lug 407 are indicated in Fig. 26. The means for setting the detent 408 in position to present the proper stop shoulder in the path of upward movement of the lug 407 includes an arm 417 (Figs. 22, 23 and 24) which is pivoted on the axis 402 and is rigidly connected with the detent 408. A spring 418 tends to swing the arm 417 forwardly and upwardly and thus tends to hold a lug 419 on said arm against a pin 420 on the bell crank 286. When the lever 292 is in the middle position shown in Fig. 24, the pin 420, acting through the arm 417, holds the detent 408 in position where the stop shoulder 414 is in position to limit upward movement of the lug 407. The addition or debit signal for both counters may then be printed. When the lever 292 is in its uppermost position the stop shoulder 411 is in position to limit movement of the lug 407 (thus providing for the printing of the debit signal for the lower counter) unless the subtraction or the total key has been depressed as will appear hereinafter.

The means for positioning the detent 408 for the printing of signals to indicate subtraction or a credit condition includes the pin 311 carried by the stem of the subtraction key 308 and arranged to swing the three-arm lever 312—312ᵃ—314. To the arm 314 of said lever is connected the forward end of a slide 421, there being a pin-and-slot connection between said arm and slide as shown at 422 in Fig. 24. The rear end of the slide 421 is guided and supported by means of a grooved portion of the rod 147, said slide having a slot 423 to receive said grooved portion. When the lever 292 is in its middle position, as shown in Fig. 24, a pin 424 on the arm 417 lies directly behind a lug 425 on the slide 421 so that upon depression of the subtraction key the arm 417 and therefore the detent 408 are swung so as to place the shoulder 413 in the path of the lug 407, thus providing for the printing of two minus signs to show that both counters were used for subtraction. When the lever 292 is in its uppermost position, the arm 417 is in such position that a pin 426 on said arm lies behind the lug 425 on the slide 421; hence if the subtraction key be depressed the arm 417 and the detent 408 will be swung so as to place the stop shoulder 410 in the path of the lug 407, thus providing for the printing of one dot and one minus sign to indicate that the lower counter has been used for subtraction.

When the lever 292 is moved to its lowermost position to bring the upper counter into use, the detents 401 and 408 are in such position that the stop surfaces 406 and 416 are both in the path of the lug 407. The stop surface 406, being lower than the surface 416, serves to stop the signal type bar in its lowermost printing position which is the one utilized for the printing of the debit clear signal and the non-add signal when the upper counter is in use. If subtraction is to be effected in the upper counter the detent 401 is swung rearwardly so as to withdraw the stop shoulder 406 from the path of the lug 407 so that the stop shoulder 416 may be effective to stop said lug, whereby the signal type bar is positioned to print the subtraction signal for the upper counter. The means for thus withdrawing the detent 401 comprises a shoulder 427 (Figs. 20 and 21) on the link 306. When the subtraction key is depressed the shoulder 427 engages a pin 428 on the detent 401 and thus swings said detent rearwardly out of effective position.

In order to place the detent 408 in position to limit the rise of the signal type bar 400 for the printing of a credit total (or clear) sign for the upper counter I provide the means to be now described.

The lug 207 (Figs. 24 and 31) on the stem of the total key 205 overlies the forward end of a lever 429 which is pivoted in the machine frame on the axis 211. Said lever comprises a rearwardly and downwardly extending arm 430 having a cam surface 431 (Fig. 29ᵃ) on its rear end.

When the lever 292 is in its lowermost position a pin 432 (Figs. 22 and 24) on the arm 417 lies directly behind the cam surface 431. If there be a credit total in the upper counter, the arm 333 (Fig. 38) will cause the link 306 to move rearwardly, thereby swinging the detent 401 rearwardly to withdraw the stop shoulder 406 from effective position. Upon depression of the total key 205, the lever 429—430 will be tilted so as to swing the arm 417 rearwardly to place the detent 408 in position where the stop shoulder 415 lies in the path of the lug 407, whereby the ascent of the signal type bar 400 is limited for the printing of the sign CR to indicate a credit total from the upper counter or a clear condition of said counter.

If there be a debit total in the upper counter and the total is to be printed, the detent 401 will be in position to limit upward movement of the lug 407, and the movement of the detent 408 caused by the tilting of the lever 429—430 is an idle or ineffective movement; but since the upward movement of the signal type bar 400 is not sufficient to unlatch the signal printing hammer the lever 429 is availed of to cause such unlatching. As shown in Fig. 24, the lever 429 comprises an upwardly extending arm 433 which, when the total key 205 is depressed, moves into position behind a pin 434 on the latch 435 that controls the signal printing hammer 436. In the ensuing handle stroke the arm 433 holds the latch 435 against pivotal movement, thus allowing the signal printing hammer 436 to be released at the appropriate moment in the cycle of operations.

When the lower counter is in use the lever 292 is in its uppermost position, as shown in full lines in Fig. 31. When a total is to be taken from the lower counter, or an item printed but not added, the total key 205 is depressed, whereby the cam surface 431 engages the pin 426 and thus causes the arm 417 and the detent 408 to move into the position shown in Fig. 31, thereby bringing the stop shoulder 409 into position to limit the upward movement of the lug 407, whereby the lowermost type is brought to the printing line.

When both counters are in use (as in Fig.

24), the detent 401 is out of effective position. Depression of the non-add key 205 causes the cam surface 431 to engage the pin 424, thus causing the arm 417 and the detent 408 to swing rearwardly to bring the stop shoulder 412 into position to limit the rise of the lug 407, whereby the seventh type, counting from the top, is brought into position to indicate that the item printed has not been added in either counter.

As indicated in Fig. 42, totals and clear signs are printed in a color contrasting with that of all other imprints.

In order to prevent the counter-selecting lever 292 from being operated after the subtraction key 308 has been depressed, I form in the rear end of the slide 421 a notch 437 to receive a pin 438 on the bell crank 286 when the latter is in the two-counter position. On the rear end of said slide is a surface 439 adapted to overlie the pin 438 when the bell crank 286 is in the lower-counter position, and a surface 440 arranged to overlie the pin 438 when the bell crank is in the upper-counter position. It will be seen that depression of the subtraction key will move the slide 421 into position to lock the bell crank in whatever position the latter occupies.

It will be noted that the counter-selecting lever 292 serves to impart a coarse adjustment to the detent 408, and that the total and non-add key 205 and the subtraction key 308 serve to effect an additional adjustment of the detent 408 into the appropriate position.

The nature of the work that may be done upon the machine is indicated in Fig. 42.

Although the present embodiment of the invention has been described in considerable detail, it will be understood that the invention is not limited to the particular construction disclosed, but that on the contrary various changes and rearrangements may be made without departing from the spirit and scope of the invention as set forth in the appended claims.

I claim as my invention:

1. The combination of two counters mounted on separate and independent axes, means for rotating the counters in one direction, means at the diametrically opposite side of the counters for rotating the latter in the opposite direction, and means to control the engagement of the counters with said rotating means, said controlling means being arranged to prevent both counters from being engaged by one of said rotating means at the same time.

2. The combination of two sets of racks which face each other, two counters mounted on parallel axes between said sets of racks, and means to control the engagement of the counters with said sets of racks, said controlling means being arranged to prevent both counters from being engaged by one of said sets of racks at the same time.

3. In an adding and subtracting machine, the combination of two sets of racks, a plurality of counters located between said racks, means actuated in the cycling of the machine for moving any of said counters into and out of mesh with either of said sets of racks, and a single manipulative means for determining with which set of racks the counter or counters shall mesh.

4. In an adding and subtracting machine, the combination of two sets of racks which face each other, a plurality of counters located one below the other between said sets of racks, means actuated in the cycling of the machine for moving any of said counters in a direction perpendicular to their respective axes into and out of mesh with said sets of racks, and a single manipulative means operable to determine which set of racks shall drive the respective counters.

5. In an adding and subtracting machine, the combination of two sets of racks, a plurality of counters arranged for actuation by said racks, means actuated in the cycling of the machine for establishing cooperative relationship between any of said counters and either of said sets of racks, and a single means for determining which of the counters shall be so moved.

6. In an adding and subtracting machine, the combination of two sets of racks, two counters located between said racks, means actuated in the cycling of the machine for moving either of said counters into and out of mesh with either of said sets of racks, and means for determining which of the counters shall be so moved, the last-mentioned means including a member capable of assuming three positions, in one of which positions only one of the counters is moved, in another of which positions only the other counter is moved, and in the third of which positions both counters are moved.

7. The combination of two counters, means for determining which of the counters shall operate, subtraction means including a subtraction key, and means actuated by said key for preventing operation of said determining means.

8. The combination of two counters arranged for successive or simultaneous operation, a three-position means to select the counter or counters which shall operate, subtraction-controlling means, and means actuated by the subtraction-controlling means for preventing operation of said selecting means in any of its positions.

9. The combination of two counters, means to actuate the counters, means for moving either counter into and out of operative relation to the actuating means, means for determining which of the counters shall be so moved, the last mentioned means including an adjustable member capable of assuming three positions, in one of which positions only one of the counters is moved, in another of which positions only the other counter is moved, and in the third of which positions both counters are moved, a manually operable member connected to move the adjustable member, and means for locking said members.

10. The combination of two counters, means to actuate the counters, means for moving either counter into and out of operative relation to the actuating means, and means for determining which of the counters shall be so moved, the last mentioned means including a slide, means for reciprocating the slide, controlling means for each counter including a link connected to said slide by a lost-motion connection, a member carried by the slide and capable of assuming three positions, in one of which positions one of the links is held stationary relatively to the slide, in another of which positions the other link is held stationary relatively to the slide, and in the third of which positions both links are held stationary relatively to the slide, and manipulative means for adjusting the position of said members.

11. The combination of two counters, means for rotating said counters in either direction, two sets of transfer members, each transfer member being arranged to be tripped by either of said counters, and means associated with one of the counters for automatically introducing the fugitive one whenever said counter passes through zero.

12. The combination of two sets of racks which face each other, two counters located one below the other between said sets of racks, means to determine which set of racks shall drive the respective counters, said means being adapted to prevent both counters from being driven by the same set of racks at the same time, and two sets of transfer members, one associated with each set of racks, each transfer member being arranged to be tripped by either of said counters.

13. The combination of two sets of racks which face each other, two counters located one below the other between said sets of racks, and two sets of transfer members, one associated with each set of racks, each transfer member having two lugs, each arranged to be engaged by one of said counters, the lower ends of said transfer members being pivoted at points between the planes of said sets of racks, and springs tending to swing said transfer members away from the counters.

14. The combination of total-taking means, means to compel a blank stroke before operation of the total-taking means, and manual means for setting the second-mentioned means.

15. The combination of a plurality of counters, means for taking a total from any of said counters, means to compel a blank stroke before operation of the total-taking means, and manual means for setting the second-mentioned means.

16. The combination of a plurality of counters, means for taking a total from any of said counters, means to select the counter from which the total is to be taken, and means to compel a blank stroke before operation of the total taking means, said selecting means being arranged to set the blank-stroke-compelling means.

17. The combination of two counters, one of which is arranged for addition and subtraction, means automatically actuated when there is a credit total in one of the counters for positioning said counter for the taking of the total, and means actuated upon subsequent use of the other counter for preventing operation of the first mentioned means.

18. The combination of two counters, one of which is arranged for subtraction, means tending to position the last mentioned counter for the taking of a credit total, and means actuated upon subsequent use of the other counter for preventing operation of the first mentioned means.

19. The combination of two counters, one of which is arranged for subtraction, means tending to position the last mentioned counter for the taking of a credit total, means to select the counter which is to be used, and means actuated in the operation of said selecting means to select the other counter for preventing operation of the first mentioned means.

20. The combination of a plurality of counters, means to select the counter or counters to be used, subtraction mechanism, total-taking mechanism, a signal printing type carrier having a series of type, and means for determining the printing position of said carrier, said means including a detent having a series of stop shoulders, said detent being movable by said selecting means, said subtraction mechanism and said total-taking mechanism.

21. The combination of a plurality of counters, means to select the counter or counters to be used, subtraction mechanism, a signal-printing type carrier having a series of type, and means for determining the printing position of said carrier, said means including a pivoted detent having a series of stop shoulders, said detent being movable by said selecting means and said subtraction mechanism.

22. The combination of a signal-printing type carrier having a series of type, means for determining the printing position of said carrier, said means comprising a pivoted detent having a series of stop shoulders, an arm rigid with said detent, means acting upon said arm for imparting a coarse adjustment to said detent, and other means acting upon said arm to effect a further adjustment of the detent.

23. The combination of a plurality of counters, means to select the counter or counters to be used, subtraction mechanism, total-taking mechanism, a signal-printing type carrier having a series of type, means for determining the printing position of said carrier, said counter-selecting means being arranged to effect a coarse adjustment of said determining means, and said subtraction mechanism and said total-taking mechanism being arranged to effect a further adjustment of said determining means.

24. The combination of two sets of racks which face each other, a plurality of counters located between said sets of racks, means for selectively or collectively moving said counters into and out of operative engagement with either of said sets of racks, means for determining which of said counters shall be so moved, a manually operable member to actuate said determining means, said member being capable of assuming a plurality of positions, in one of which positions said counters are moved collectively, in another of which positions only one of said counters is moved, and manipulative means operable to lock said counter-determining means against movement.

25. In an adding and subtracting machine, the combination of two counters, means to actuate the counters, machine operated means for moving either counter into and out of operative relation to the actuating means, manipulative means for determining which of the counters shall be so moved, subtraction-controlling means, and means actuated by said last mentioned means for preventing operation of said manipulative determining means.

26. The combination of two sets of racks, a plurality of counters adapted to be actuated by said racks, means for selectively or collectively moving said counters into and out of operative engagement with either of said sets of racks, means for determining which of said counters shall be so moved, a signal printing type bar adapted to be variously positioned to indicate whether one or a combination of said counters has been actuated, and a single manipulative member to actuate said determining means and to control positioning of said type bar.

27. The combination of two sets of racks which face each other, a plurality of counters located between said sets of racks, means for selectively or collectively moving said counters into and out of operative engagement with either of said sets of racks, means for determining which of said counters shall be so moved, printing means to indicate which one or ones of said counters have been actuated, and manually operable means effective to jointly control said determining means and said printing means.

28. The combination of two counters, two sets of racks to actuate said counters, means for individually moving either counter into mesh with either rack or for simultaneously moving one counter into mesh with one rack and the other counter into mesh with the other rack, manipulative means for determining whether one or the other or both counters shall be so moved, subtraction-controlling means, and means actuated by the subtraction-controlling means for preventing operation of said manipulative determining means.

29. The combination of two counters, two sets of racks to actuate both of said counters for addition and subtraction, means for moving either counter into and out of operative relation to the racks as an incident to the cyclic operation of the machine, and means to control the engagement of the counters with said racks said controlling means being arranged to prevent both counters from being engaged by one of said sets of racks at the same time.

30. In an adding and subtracting machine, the combination of two counters, a set of racks effective to rotate one of said counters additively and the second of said counters subtractively, a second set of racks effective to rotate the one counter subtractively and the second counter additively, means for individually moving either counter into mesh with either set of racks or for simultaneously moving one counter into engagement with one set of racks, and the other counter into engagement with the other set of racks, manipulative means for determining whether one or the other or both counters shall be so moved, subtraction controlling means, total taking means, and signal printing means sensitive to actuation of said manipulative determining means, said subtraction means and said total taking means to indicate whether one or both counters have been rotated additively or subtractively or whether either counter has been operated to take a total.

31. In a computing machine, the combination of a plurality of counters, each adapted for addition and subtraction, means for taking totals from any of said counters, means to enforce a blank cycle of the machine, and means operated after a negative total has been taken from one of the counters and before a total is taken from another counter to cause operation of the blank-cycle-enforcing means.

32. The combination of a counter capable of giving a true negative total and another counter capable of giving a positive total, means to select the desired counter for use, means tending to condition the selected counter for a negative operation when there is a negative total in the first counter, and means operable by the selecting means to prevent said conditioning means from operating when the other counter is to be used.

33. The combination of a counter capable of giving a true negative total and another counter capable of giving a positive total, means to select the desired counter for use, means tending to condition the selected counter for a negative operation when there is a negative total in the first counter, and means to prevent said conditioning means from operating when the other counter is to be used.

OSCAR J. SUNDSTRAND.